(12) United States Patent
Kumar et al.

(10) Patent No.: US 8,534,199 B2
(45) Date of Patent: Sep. 17, 2013

(54) METHOD FOR CONTROLLING A POWERED SYSTEM

(75) Inventors: Ajith Kuttannair Kumar, Erie, PA (US); Wolfgang Daum, Erie, PA (US)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 12/984,792

(22) Filed: Jan. 5, 2011

(65) Prior Publication Data
US 2011/0106401 A1    May 5, 2011

Related U.S. Application Data

(60) Division of application No. 11/680,706, filed on Mar. 1, 2007, now Pat. No. 7,882,789, which is a continuation-in-part of application No. 11/136,769, filed on May 25, 2005, now Pat. No. 7,500,436, and a continuation-in-part of application No. 11/008,708, filed on Dec. 9, 2004, now Pat. No. 7,302,895, and a continuation-in-part of application No. 10/435,261, filed on May 9, 2003, now Pat. No. 7,231,877, which is a continuation-in-part of application No. 10/032,714, filed on Dec. 26, 2001, now Pat. No. 6,612,245, said application No. 11/008,708 is a continuation-in-part of application No. 10/354,638, filed on Jan. 30, 2003, now Pat. No. 6,922,619, said application No. 11/680,706 is a continuation-in-part of application No. 10/849,314, filed on May 19, 2004, now Pat. No. 7,131,614.

(60) Provisional application No. 60/590,853, filed on Jul. 23, 2004, provisional application No. 60/278,975, filed on Mar. 27, 2001, provisional application No. 60/319,128, filed on Feb. 28, 2002, provisional application No. 60/590,853, filed on Jul. 23, 2004, provisional application No. 60/474,151, filed on May 22, 2003.

(51) Int. Cl.
*B61C 1/00* (2006.01)
*B61L 3/00* (2006.01)

(52) U.S. Cl.
USPC ............................ 105/27; 246/186

(58) Field of Classification Search
USPC ............... 105/26.05, 27; 246/167 R, 182 R, 246/186, 187 C
See application file for complete search history.

(56) References Cited

U.S. PATENT DOCUMENTS 5,167,008 A    11/1992    Engeler
5,647,231 A    7/1997    Payne et al.
(Continued)

FOREIGN PATENT DOCUMENTS
EP    1 136 969    9/2001

OTHER PUBLICATIONS

Digital Control of Dynamic Systems, Franklin et al, Addison-Wesley Publishing Co., 1981, pp. 247-273.

*Primary Examiner* — R. J. McCarry, Jr.
(74) *Attorney, Agent, or Firm* — GE Global Patent Operation; John A. Kramer

(57) ABSTRACT

A method is provided for controlling a powered system including an engine operating on a plurality of fuel types. The method includes generating operational input signals from operational input devices, and generating a respective configuration signal indicative of a particular location of the powered system along a predetermined course comprising a mission. Additionally, based on the operational input signals, the configuration signal, and a respective engine emission profile for each of said configuration signal, the method includes generating control signals to a plurality of end use devices of the powered system to limit one or more of the total engine emissions of the fuel types, the total fuel efficiency of the fuel types, the total output power of the engine, a time of arrival of the powered system along the predetermined course, and/or a combination thereof.

30 Claims, 10 Drawing Sheets

(56) References Cited

U.S. PATENT DOCUMENTS

| | | |
|---|---|---|
| 5,857,321 A | 1/1999 | Rajamani et al. |
| 6,078,850 A | 6/2000 | Kane et al. |
| 6,078,911 A | 6/2000 | Bonissone et al. |
| 6,144,901 A | 11/2000 | Nickles et al. |
| 6,257,174 B1 * | 7/2001 | Huff et al. .................. 123/1 A |
| 6,397,759 B1 | 6/2002 | Hubert et al. |
| 6,490,523 B2 | 12/2002 | Doner |
| 6,622,067 B1 | 9/2003 | Lovelace et al. |
| 6,636,798 B2 * | 10/2003 | Biess et al. .................. 701/112 |
| 6,658,330 B2 | 12/2003 | Delaruelle |
| 6,760,712 B1 | 7/2004 | Bonissone et al. |
| 7,762,127 B2 * | 7/2010 | Schneider et al. ......... 73/114.73 |
| 2002/0059075 A1 | 5/2002 | Schick et al. |
| 2003/0078707 A1 | 4/2003 | Shioda et al. |
| 2003/0213875 A1 | 11/2003 | Hess, Jr. et al. |
| 2004/0133315 A1 | 7/2004 | Kumar et al. |
| 2004/0245410 A1 | 12/2004 | Kisak et al. |
| 2005/0120904 A1 | 6/2005 | Kumar et al. |

\* cited by examiner

| Configuration Input | Operational Inputs | End Use Device Outputs | |
|---|---|---|---|
| H | 1 1 0 0 | 1 0 1 0 1 | Mode 1 |
| L | 1 1 0 0 | 1 1 1 0 0 | Mode 2 |

METHOD FOR CONTROLLING A POWERED SYSTEM

CROSS-REFERENCE TO RELATED APPLICATIONS

The present application is a Divisional of U.S. application Ser. No. 11/680,706 filed Mar. 1, 2007 now U.S. Pat. No. 7,882,789, which is a Continuation-In-Part of U.S. application Ser. No. 11/136,769 filed May 25, 2005 now U.S. Pat. No. 7,500,436, which claims priority from U.S. Provisional Application No. 60/590,853 filed Jul. 23, 2004, which is a Continuation-In-Part of U.S. application Ser. No. 11/008,708 filed Dec. 9, 2004 now U.S. Pat. No. 7,302,895, which also claims priority from U.S. Provisional Application No. 60/590,853 filed Jul. 23, 2004, and incorporated herein by reference in its entirety.

U.S. application Ser. No. 11/008,708 is a Continuation-In-Part of U.S. application Ser. No. 10/435,261 filed May 9, 2003 now U.S. Pat. No. 7,231,877, which is a Continuation-In-Part of 10/032,714 filed Dec. 26, 2001, now U.S. Pat. No. 6,612,245 issued Sep. 2, 2003, which claims priority from U.S. Provisional No. 60/278,975 filed Mar. 27, 2001, and incorporated herein by reference in its entirety.

U.S. application Ser. No. 11/008,708 is also a Continuation-In-Part of U.S. application Ser. No. 10/354,638 filed Jan. 30, 2003, now U.S. Pat. No. 6,922,619 issued Jul. 26, 2005, which claims priority from U.S. Provisional Application No. 60/319,128 filed Feb. 28, 2002, and incorporated herein by reference in its entirety.

U.S. application Ser. No. 11/680,706 is also a Continuation-In-Part of U.S. application Ser. No. 10/849,314 filed May 19, 2004, now U.S. Pat. No. 7,131,614 issued Nov. 7, 2006, which claims priority from U.S. Provisional Application No. 60/474,151 filed May 22, 2003, and incorporated herein by reference in its entirety.

BACKGROUND OF THE INVENTION

The field of this invention relates generally diesel powered systems, such as locomotives, off highway vehicles, marine vehicles and/or stationary diesel powered systems and, more particularly, to a system, method, and computer software code for managing the emissions from diesel powered systems.

Diesel powered systems such as, but not limited to, off-highway vehicles, marine diesel powered propulsion plants, stationary diesel powered system and rail vehicle systems, or trains, usually are powered by a diesel power unit. Modern railroad locomotives are complex vehicles containing multiple operating systems including sophisticated computerized controls responsive to a large number of input variables. A typical electro-motive railroad locomotive is propelled by a plurality of AC or DC traction motors connected to respective drive axles, with the electrical energy for the motors being supplied by an on-board generator powered by a diesel engine.

Locomotives are assembled in a number of different configurations so as to satisfy one or more respective mission requirements served by a railroad. One may appreciate that the operational requirements for over-the-road hauling are significantly different than those for switchyard operation. For example, a switcher locomotive generally moves a relatively small number of cars across a mostly flat area at low speeds, whereas road-hauling locomotives must be capable of moving a train at relatively high speeds across terrain that may include significant changes in topography. A switcher locomotive may also spend a significant amount of time idling, whereas road locomotives must operate for long periods at high power levels.

Railroad mission requirements are affected by numerous variables including customer demand, weather, equipment availability, personnel availability, government regulations, etc., and it is often impossible for a railroad dispatcher to make available the best-suited locomotive for a particular mission. For example, even a single mission as simple as moving a train from point A to point B may involve mission demands that vary significantly with the geography of the railroad track, such as different government emission regulations at different points along a railroad track. As a result, a locomotive originally assembled with the configuration suited for an initial intended mission will provide less-than-optimal configuration when placed into service for another and different mission, and typically the best a dispatcher is able to do is to provide a locomotive that presents a good compromise of capabilities to meet a range of different (and often competing) mission requirements. Additionally, locomotives do not presently account for multiple fuel types or fuel mixes when entering various geographic regions, and thus fail to factor in the most efficient operating fuel type(s) to comply with the government emission regulations for each geographic region.

BRIEF DESCRIPTION OF THE INVENTION

In one embodiment of the present invention, a method is provided for controlling a powered system including an engine operating on a plurality of fuel types. The method includes generating operational input signals from operational input devices, and generating a respective configuration signal indicative of a particular location of the powered system along a predetermined course comprising a mission. Additionally, based on the operational input signals, the configuration signal, and a respective engine emission profile for each of said configuration signal, the method includes generating control signals to a plurality of end use devices of the powered system to limit one or more of the total engine emissions of the fuel types, the total fuel efficiency of the fuel types, the total output power of the engine, a time of arrival of the powered system along the predetermined course, and/or a combination thereof.

In another embodiment of the present invention, computer readable media is provided containing program instructions for controlling a powered system including an engine operating on a plurality of fuel types. The computer readable media includes a computer program code for generating operational input signals from operational input devices. The computer readable media also includes a computer program code for generating a respective configuration signal indicative of a particular location of the powered system along a predetermined course comprising a mission. Based on the operational input signals, the configuration signal, and a respective engine emission profile for each of the configuration signal, the computer readable media also includes a computer program code for generating control signals to end use devices of the powered system to limit one or more of the total engine emissions of the fuel types, the total fuel efficiency of the fuel types, the total output power of the engine, a time of arrival of the powered system along the predetermined course, and a combination thereof.

DETAILED DESCRIPTION OF THE INVENTION

Figures 1, 2:
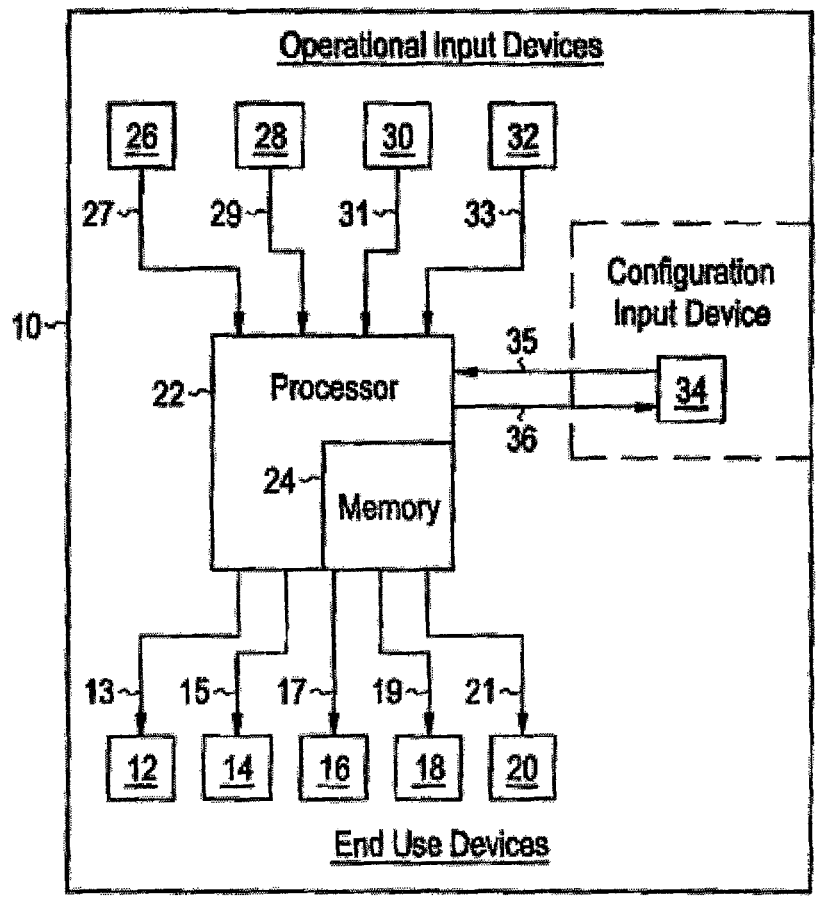
FIG. 1 is a block diagram of a control system of a diesel-fueled power generating unit including a configuration input.
FIG. 2 is a table illustrating the relationship between control system inputs and outputs for two configuration modes of the diesel-fueled power generating unit of FIG. 1.

The applicants of the present invention have discovered that by controlling emissions of diesel powered systems including diesel-fueled power generating unit, such as locomotive engines relative to geographic locations, management of railroad operations such as emissions monitoring and emissions credit trading may be improved over conventional techniques. FIG. 1 is a block diagram of a control system of a diesel-fueled power generating unit, such as a locomotive 10 that can be operated in one of several configurations in order to better match the locomotive 10 to a particular mission. The term configuration is used herein to describe the overall operating profile of a diesel-fueled power generating unit, such as a locomotive, including important operating characteristics and the manner in which the operating systems of the diesel-fueled power generating unit are controlled in response to operational inputs. A diesel-fueled power generating unit's configuration may include performance variables such as the peak output rating of the engine, the correlation between the throttle notch settings and the percentage of full power generated, engine emissions curves, acoustic emissions, electromagnetic emissions, the number of traction motors used, fuel economy performance, adhesion limits, the organization, presentation and functionality of operator controls, communications protocol, auxiliary functions, etc.

Though exemplary embodiments of the present invention are described with respect to rail vehicles, specifically trains and locomotives having diesel engines, exemplary embodiments of the invention are also applicable for other uses, such as but not limited to off-highway vehicles, marine vessels, and stationary units, each which may use a diesel engine. Towards this end, when discussing a specified mission, this includes a task or requirement to be performed by the diesel powered system. Therefore, with respect to railway, marine or off-highway vehicle applications this may refer to the movement of the system from a present location to a destination. In the case of stationary applications, such as but not limited to a stationary power generating station or network of power generating stations, a specified mission may refer to an amount of wattage (e.g., MW/hr) or other parameter or requirement to be satisfied by the diesel powered system. Likewise, operating condition of the diesel-fueled power generating unit may include one or more of speed, load, fueling value, timing, etc.

In one exemplary example involving marine vessels, a plurality of tugs may be operating together where all are moving the same larger vessel, where each tug is linked in time to accomplish the mission of moving the larger vessel. In another exemplary example a single marine vessel may have a plurality of engines. Off Highway Vehicle (OHV) may involve a fleet of vehicles that have a same mission to move along earth, from location A to location B, where each OHV is linked in time to accomplish the mission. With respect to a stationary power generating station, a plurality of stations may be grouped together collectively generating power for a specific location and/or purpose. In another exemplary embodiment, a single station is provided, but with a plurality of generators making up the single station.

The operating systems of a diesel-fueled power generating unit, such as a locomotive, include a plurality of end use devices 12, 14, 16, 18, 20. The end use devices may include fuel pumps, valves, lamps, semiconductor devices, switches, motors, compressors, resistance grids, energy storage batteries for hybrid locomotives, etc. These end use devices are part of respective operating systems of the diesel-fueled power generating unit, such as the fuel system, engine cooling system, braking system, diagnostic systems, operator control panels, etc. The end use devices may include elements located off-board the diesel-fueled power generating unit, such as an off-board planning or reporting element, for example. A computing device such as a processor 22, executing operating instructions stored in a memory 24, is used to control the end use devices via end use device control signals 13, 15, 17, 19, 21. A plurality of operational input devices 26, 28, 30, 32 are in communication with the processor 22 to provide a respective plurality of input signals 27, 29, 31, 33 to the processor. The input devices may be sensors, systems or other components located primarily on-board the diesel-fueled power generating unit, and in some embodiments, off-board of the diesel-fueled power generating unit. The stored instructions are programmed so that the end use devices are controlled in a predetermined manner in response to the operational inputs. Thus, the instructions executed by processor 22 operate as a transfer function to convert a set of input signals 27, 29, 31, 33 to a set of output signals 13, 15, 17, 19, 21.

In a prior art diesel-fueled power generating unit, the relationship between each possible set of operational input states and the respective mode of control of the end use devices (i.e., the transfer function implemented by the computing device) is fixed in accordance with the configuration of the diesel-fueled power generating unit. In contrast, the diesel-fueled power generating unit, such as a locomotive 10 of FIG. 1 includes a configuration input device 34 different from the operational input devices (26, 28, 30, 32) connected to the processor for generating a configuration input signal 35, with the configuration input signal 35 having at least two state sets and being different from the input signals (27, 29, 31, 33). The computing device 22 of FIG. 1 includes executable instructions that allow the relationship between at least one of the possible sets of operational input states (i.e., one set of values of 27, 29, 31, 33) and the respective mode of control of the end use devices (i.e., the set of values of 13, 15, 17, 19, 21) to be varied in response to the value of the configuration input signal 35. In other words, the processor 22 may be configured to operate as two or more different transfer functions, with the selection of the transfer function being responsive to the configuration input signal 35. Thus, a diesel-fueled power generating unit, such as locomotive 10, may be provided with two or more distinct configurations, such as two or more different emissions profiles. Note that FIG. 1 illustrates the configuration input device 34 as being on-board the diesel-fueled power generating unit, such as locomotive 10; however the dotted lines are meant to illustrate an embodiment where the configuration input device 34 may be located off-board of the diesel-fueled power generating unit, such as locomotive 10, with the configuration input signal 35 being provided to the locomotive 10 via a suitable communication link, such as train lines or wireless communications.

This concept is illustrated in the table of FIG. 2, where two different modes of operation are illustrated for two different configuration input state sets. When the configuration input 35 has a high value H and the four operational inputs 27, 29, 31, 33 have values of 1, 1, 0 and 0 respectively, processor 22 will implement a first transfer function to produce output signals 13, 15, 17, 19, 21 having respective values of 1, 0, 1, 0, and 1 to control the five end use devices. This relationship is in accordance with a first configuration of the diesel-fueled power generating unit, such as locomotive, such as when operating under a first emissions limit. In contrast, when the configuration input 35 has a low value L and the four operational inputs 27, 29, 31, 33 have those same values of 1, 1, 0 and 0 respectively, processor 22 will implement a second transfer function to produce output signals 13, 15, 17, 19, 21 having respective values of 1, 1, 1, 0 and 0, thereby controlling the five end use devices differently than in the first mode. This relationship is in accordance with a second configuration of the diesel-fueled power generating unit, such as a locomotive, such as when operating under a second emissions limit, different than the first configuration. The difference in the control signals provided to the end use devices 12, 14, 16, 18, 20 between these two modes allows the diesel-fueled power generating unit, such as the locomotive to be configured in two different ways in response to the configuration input variable. One skilled in the art will appreciate that the control system and variable states used in the illustration of FIGS. 1 and 2 are illustrative only and are purposefully simplistic. Modern diesel-fueled power generating unit and locomotive embodiments may literally include hundreds of such inputs and outputs, including more than one configuration input variable, and including both analog, digital, neural network and/or fuzzy logic circuitry. Portions of the processing may be accomplished off-board of the diesel-fueled power generating unit, such as a locomotive and communicated to an on-board device for further processing or direct end use device control. Furthermore, the processor 22 may be configured to provide an input signal 36 to the confirmation input device 34, such as feedback from a learning function used to modify an input behavior. In one embodiment, a time series infinite polynomial Taylor function may be used to modify a sensor function. A learning function implemented by processor 22 may further learn in a first manner in one configuration and in a second manner in a second configuration. A distributed learning function may be accomplished on-board the locomotive in real time in order to provide improved performance over prior art devices.

By way of example, a fuzzy logic controller (FLC) may be a knowledge-based system in which the knowledge of locomotive operators, locomotive engineers or knowledge gained from a fleet of locomotives has been used to synthesize a closed loop controller for the locomotive. Such FLCs are typically derived from a knowledge acquisition process, but may be automatically synthesized from a self-organizing control architecture. It will be appreciated that the locomotive sensors used by an FLC may be less expensive and may require relatively less precision than the sensors used by a traditional non-fuzzy controller due to the distinct granularity level with which the control laws may be processed by the FLC. It will be further appreciated that fuzzy logic may be used in a locomotive to make decisions and provide measurement and/or control outputs based on one or more inputs of an analog nature in accordance with a set of inferencing rules. Fuzzy logic can make "best guess" decisions in circumstances where input data is incomplete and/or inconsistent. It is contemplated that a FLC can enable the owner of a fleet of locomotives to customize locomotive operation for any given application. Locomotive parameters may be stored in a suitable memory, and control functions may be performed in control logic. Thus, the owner may readily update the information on a computer and download updated locomotive parameters to individual locomotives. A portable receiver/transmitter may be utilized to transfer information to the locomotive controller by way of a communications link. It is further contemplated that one may use a reconfigurable fuzzy logic controller which may be general purpose, yet have a functionality that may be readily adjusted in accordance with the type of locomotive and/or locomotive application. For example, the core structure of the fuzzy logic controller may be virtually identical for a myriad of locomotive applications. However, application-specific definitions of both fuzzy logic membership functions and/or fuzzy logic rules may be input to the controller as a set of parameters, such that the fuzzy logic controller is programmably reconfigurable without changing the actual fuzzy logic. In one exemplary embodiment, a configurable locomotive embodying aspects of the present invention may include a fuzzy logic processor configured to generate one or more transfer functions or executable instructions for relating the input signals to the output control commands during a given configuration mode. For readers desirous of general background information regarding fuzzy logic controllers reference is made to U.S. Pat. No. 6,760,712, titled "Automatic Train Handling Controller, U.S. Pat. No. 6,078,911, titled "Compilation of Rule Bases for Fuzzy logic Control," and U.S. Pat. No. 5,647,231 titled "Appliance Electronic Control System with Programmable Parameters Including Programmable and Reconfigurable Fuzzy Logic Controller," each assigned in common to the assignee of the present invention.

By way of example, a neural network controller may comprise at least one neural network estimator for generating one or more estimated transfer functions. Typically, the neural network estimator may be coupled to receive selected sensed locomotive operating parameters from various sensors, such as speed, emissions, notch level, tractive effort, etc., to generate an estimated transfer function that may be coupled to an actuator system. In another example, the neural network estimator can be coupled to receive inputs from processors generating computed values of locomotive operating parameters (e.g., from other neural networks, fuzzy logic controller, or locomotive models programmed in a processor of the controller) in addition to sensed parameters.

The neural network estimator may be a nonlinear estimator that can be trained to map a selected range of input signals so as to generate a desired output parameter that varies in correspondence with the input signals. The neural network estimator may typically comprise an input neuron layer and at least a first hidden neuron layer. Multiple hidden neuron layers, e.g., through an nth hidden neuron layer, may be coupled together, with the nth hidden neuron layer being coupled to an output neuron layer. By way of example, biasing means (such as a power supply that provides a stable, determinable power level or any other suitable biasing device) may be coupled to each neuron layer of the neural network estimator to provide a means to adjust the transfer function of the controller, e.g., a squashing function, or the non-linear characteristic function for respective neurons in a layer. Signals passed from each layer to the next may be processed by applying respective weights (associated with each respective neuron) to each signal passing from the neuron. The respective weights for each layer may be determined in a training sequence using techniques readily understood by one skilled in the art. For example, during training of a neural net, prescribed patterns of input signals may be sequentially and repetitively applied, for which patterns of input signals there may be corresponding prescribed patterns of output signals known. The pattern of output signals generated by the neural net, responsive to each prescribed pattern of input signals, may be compared to the prescribed pattern of output signals to develop error signals, which are used to adjust the weights as the pattern of input signals is repeated several times, or until the error signals are detected as being negligibly valued. Then training may be done with the next set of patterns in the sequence. During extensive training the sequence of patterns may be recycled. In one exemplary embodiment, a configurable locomotive embodying aspect of the present invention may include a neural network processor configured to adjust, e.g., over a training period or sequence, one or more transfer functions or executable instructions for relating the input signals to the output control commands. For readers desirous of general background information regarding neural network controllers reference is made to U.S. Pat. No. 5,167,008 titled "Digital Circuitry for Approximating Sigmoidal Response in A Neural Network Layer" and U.S. Pat. No. 5,857,321 titled "Controller with Neural Network for Estimating Gas Turbine Inter Cycle Parameters," each assigned in common to the same assignee of the present invention.

It will be appreciated that one may make use of optimal control techniques as a tool in the design of a multivariable locomotive controller. One should be cognizant that achieving an all-encompassing true "optimal" design may not be realistic since in a practical implementation achieving a partially optimal design should be considered a success. For example, it is contemplated that such a design will make coordinated use of all input, output and control variables, and will be organized to ensure a stable locomotive controller that can be logically changed (e.g., reconfigured) to meet a set of desired performance objectives for the locomotive. In one exemplary embodiment, optimal control techniques may be attractive since such techniques can readily handle multi-input systems and allow the designer to quickly determine appropriate candidate values for a control law matrix. As will be recognized by those skilled in the art, in general, one would not have available all possible system states for performing a given control strategy. For example, it may be neither practical nor necessary to install a sensor for sensing every possible locomotive state since one can provide an estimator for estimating any missing states rather than sensing or measuring every possible locomotive state. In one exemplary embodiment one may make use of optimal estimation techniques as a tool in the design of a multivariable locomotive estimator that may be used in conjunction with the locomotive controller. One example of an optimal estimation technique may be a time-varying optimal estimation solution, commonly referred in the art as the "Kalman filter." Essentially, the optimal estate solution in this case is given by a recursive weighted least-square solution. For readers desirous of general background information regarding various control techniques reference is made to textbook titled "Digital Control of Dynamic Systems" by Gene F. Franklin and J. David Powell, 2nd printing 1981, published and copyrighted by Addison-Wesley Publishing Company.

In one embodiment of the present invention the configuration input signal 35 may be responsive to geographic location of the diesel-fueled power generating unit, such as locomotive 10. The location of the locomotive may be determined using an appropriate input device 34, such as a global positioning system (GPS) or a wireless wayside automatic electronic identification (AEI) tag, for example. Alternatively, the configuration input signal 35 may be indicative of the health of the locomotive, such as may be derived from on-board or off-board equipment, including diagnostic and/or control systems. Alternatively, the configuration input may be responsive to an operator input, such as when the configuration input device 34 is an operator-controlled switch, computer mouse, touch screen, keyboard, identification card reader, bar code reader, etc., with or with the requirement for a password or key. In addition to the operator being located on board the locomotive, configuration of the locomotives may be effected from a location adjacent to the locomotive such as at a railyard control tower, or remote from the locomotive such as from a remote data center or dispatch office. In one embodiment, a signal indicative of the health of one locomotive of a consist may be used to reconfigure a second locomotive in the consist; for example, when a maximum power generating capacity of the first locomotive becomes degraded, the second locomotive may be reconfigured to a higher peak power level to make up for power lost from the first locomotive. In another embodiment, a signal indicative of an emission limit may be received from a central emission control center and may be used to configure the vehicle to operate within that emission limit. The configuration input may alternatively include a device that changes an analog or digital signal; for example, altering, adding or deleting a message, changing a message sequence, or offsetting a sensor signal to cause the locomotive 10 to operate in a different configuration.

In another embodiment, the configuration input may be responsive to an operator input. For example, an operator of the diesel-fueled power generating unit, such as a locomotive may implement a different configuration upon identifying that the locomotive is entering a different area having different configuration requirements, such as by recognizing a milepost marker or other rail side indicia, indicative of a boundary of the different area. In another embodiment, configuration inputs for changing a configuration may be preprogrammed based on distance of the locomotive from a different operation area. For example, an operator may input a distance from a present location of the locomotive to a different operational area. Then, based on a sensed distance traveled, the locomotive may automatically change its operating configuration upon traveling the distance to arrive at the different area.

Figure 8:
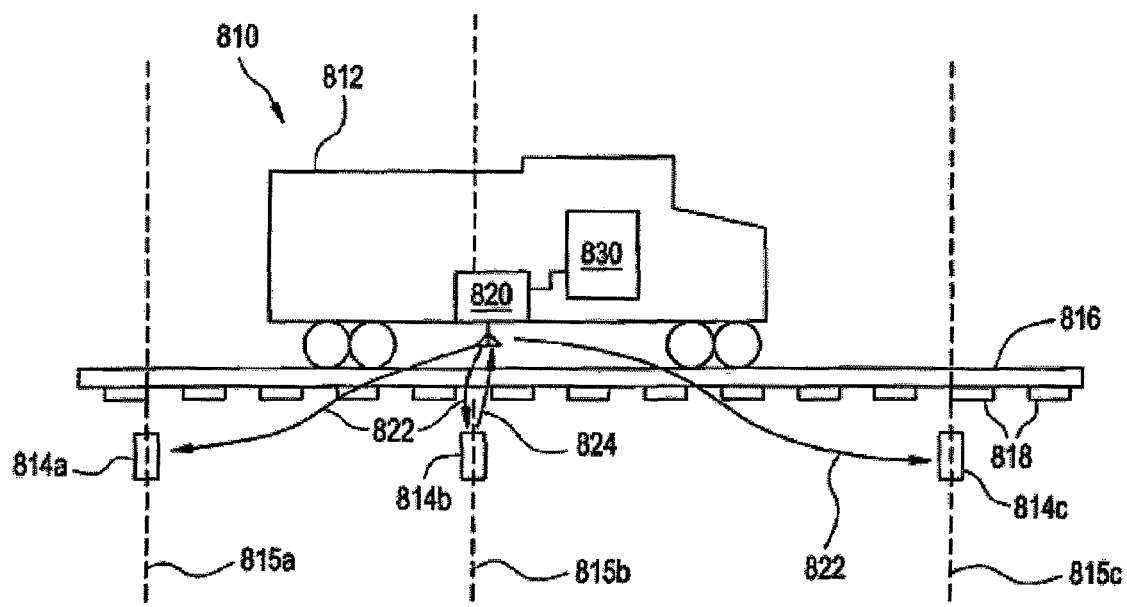
FIG. 8 is an illustration of operating a diesel-fueled power generating unit as a function of the location of the diesel-fueled power generating unit according to one embodiment of the invention.

FIG. 8 shows a system 810 for controlling a diesel-fueled power generating unit, such as a locomotive operating condition, such as an emission parameter, in response to information encoded in transponders 814a, 814b, 814c positioned along the track 816. For example, the transponders 814a, 814b, 814c may be positioned at predetermined boundaries 815a, 815b, 815c to identify the boundary to a locomotive 812 passing the boundary 815a, 815b, 815c. Transponders 814a, 814b, 814c, such as AEI tags (commercially available, for example, from Transcor, Incorporated) may be positioned in the bed of the track 816 at a location where a locomotive operating condition is desired to be controlled. The transponder 814 may be attached to a tie 818 located at an entrance to a rail yard area to limit the speed of locomotive 812. The locomotive 812 may be equipped with a transponder reader 820 to read the information encoded in each transponder 814a, 814b, 814c that locomotive 812 passes while traveling along the track 816. While the following describes a reader 820 located on the locomotive 812, it should be understood that the reader 820 may be installed on any car or locomotive on a train. In some instances, the locomotive 812 operates without an attached car or another locomotive and, thus, the locomotive 812 itself then constitutes the train. The reader 820 may be configured to provide control information read from a transponder 814a, 814b, 814c to a controlling locomotive of the train, or to a remote control operator.

In one embodiment, the reader 820 may radiate a radio frequency (RF) activation signal 822 that is received by the transponder 814b. The activation signal 822 provides sufficient energy to the transponder 814b to allow the transponder 814b to radiate a transponder signal 824 back to the reader 820. The transponder signal 824 may typically be an RF signal having a frequency different than that of the activation signal 822. The transponder may also be powered by another suitable source of power, such as batteries, solar power, or a line to a power source. Typically, the reader must be located within a suitable detection distance from the transponder, for example, within 10 feet (3.048 meters), to receive the transponder signal 824. Accordingly, transponders may need to be spaced at distances greater than such detection distance to prevent interference among transponders. Unique identifiers for the communication of each transponder with the reader may also be used to allow for closer spacing of transponders.

The reader 820 is in communication with an onboard control system 830, such as a locomotive control unit (LCU) that controls the locomotive 812. After reading a transponder, the reader 820 provides the control information encoded in the transponder signal 824 to the onboard control system 830 to control the operating parameters of the locomotive 812. The locomotive 812 may then maintain these same operating parameters until another transponder 814c is passed, and new control information is received. The control information received from each transponder 814a, 814b, 814c may be directly provided to the onboard control system 830 for automatic control of the locomotive 812.

In an aspect of the invention, two or more sequentially positioned transponders may be configured to provide control information dependent on the direction of locomotive travel with respect to the transponders. For example, transponder 814a may comprise a pair of transponders positioned at the boundary 815a to provide control information to control the operating parameters of the locomotive 812 depending on a direction of travel along the rail, such as if the locomotive 12 is entering or leaving an area 817 bounded by the boundary 815. A boundary may include a state line between two states requiring different emission profiles. As the locomotive 812 detects leaving one state and entering an adjacent state by passing, for example paired transponders in a certain direction, the locomotive 812 may be instructed to change an emissions parameter corresponding to the requirements of the state it has just entered. In another aspect of the invention, the reader 820 may be mounted on a different locomotive or rail car of a train of which the locomotive 812 is a member. For example, the locomotive 812 being controlled may be a member of consist of a train, wherein the different locomotive is also a member of the consist. The different locomotive detects its location and transmits the location information to the locomotive 812 for controlling the locomotive's 812 emissions responsive to the location information provided by the different locomotive.

One or multiple aspects of the diesel-fueled power generating units, such as a locomotive's performance may be altered to change the locomotive's configuration in response to a change in the configuration input. In one embodiment, the locomotive may be reconfigured from a first horsepower rating to a second horsepower rating in response to a configuration input change. Consider an example where a taxing authority levies a tax that increases with the size/power rating of the locomotive. If a railroad needs a 5,000 horsepower locomotive to move a train through the region of that taxing authority, but has available only a 6,000 horsepower locomotive to perform this mission, then the 6,000 horsepower locomotive could be reconfigured to a 5,000 horsepower mode for this mission in order to avoid paying an excessive amount of taxes. This change in configuration may be accomplished in response to an operator selection as the configuration input variable, or alternatively it may be performed automatically in response to a configuration input responsive to location as the locomotive approaches the geographic region of concern. The peak power level configuration change may involve instructions executed by the processor to change the response of end use devices in the throttle and/or fuel delivery systems of the locomotive. The power output of the engine delivered in response to at least one of the throttle notch setting is changed between the two configurations. This may be accomplished, for example, by including instructions executable by the computing device to recognize X notch settings (typically 8 power notch settings are available) in a throttle input device when the configuration input has a first value and to recognize more or less than X notch setting in the throttle input device when the configuration input has the second value. In a typical North American locomotive, the throttle divides the power range into notches 1 through 8; all eight of the notch settings may be recognized in the first (6,000 horsepower) configuration. In the second (5,000 horsepower) configuration such as used for non-North American locomotives may have as many as 15 notch settings, the throttle control system would recognize a notch 15 input, but rather would maintain the end use device outputs for notch 15 to be the same as the end use device outputs for the previous notch 8 setting. Thus, the exact same set of operational input variable values (e.g. throttle set to notch 8) will produce two different sets of end use device control output values (e.g. fuel injection valve actuation timing) as a result of the respective change of the configuration input value. Alternatively, in the first configuration the fuel system may provide fuel to all X cylinders (typically 8, 12 or 16 cylinders) of the diesel engine, while fuel may be provided to less than X cylinders in the second configuration, thereby accomplishing a reduction in the peak engine power output.

Another embodiment of the invention may change the number of traction motors that are powered in the diesel-fueled power generating unit, such as a locomotive or the power level setting of the traction motors. In a first configuration, every traction motor on the locomotive may be powered, such as would be needed for normal open road load hauling missions. In a second configuration, fewer than all of the traction motors may be powered. This may be accomplished using instructions executable by the computing device to permit the powering of X traction motors of the locomotive when the configuration input has a first value and to permit the powering of less than X traction motors of the locomotive when the configuration input has a second value. Similarly, the power level of the active traction motors may be varied in response to a configuration input variable.

One embodiment of the present invention may be utilized in a diesel-fueled power generating unit, such as a locomotive consist where a plurality of locomotives are joined together to pull a train. All of the locomotives in a consist are typically controlled by a single engineer from a lead locomotive, with the trailing locomotives being in communication with the lead locomotive and responding to the engineer's input. Each locomotive exhibits a maximum adhesion limit, i.e., the amount of power that can be applied to the wheel of the locomotive before wheel slip will occur. If all of the locomotives are not of the same type and therefore do not all have the same adhesion limit, situations can arise where uncontrolled wheel slip may occur if the lead locomotive has a higher adhesion limit than a trailing locomotive. One embodiment includes instructions executable by the computing device to operate an engine of a locomotive below a first adhesion limit when the configuration input has the first value and to operate the engine of the locomotive below a second adhesion limit less than the first adhesion limit when the configuration input has the second value. In this manner, a lead locomotive having a higher adhesion limit than a trailing locomotive may be reconfigured to operate as if it had the same adhesion limit as the trailing locomotive, thereby eliminating problematic wheel slip concerns. The configuration input signal 35 may be responsive to any operating parameter of another locomotive in the train. For example, a signal indicative of the power level or of the health of a trailing locomotive may be used as a configuration input signal 35 for reconfiguring a lead locomotive to a respective peak power level responsive to the signal 35.

The control systems of a diesel-fueled power generating unit, such as a locomotive may be programmed to respond in accordance with a predetermined set of mission priorities. For example, the mission priority for an express road locomotive may be to maintain the desired power output in order to ensure that a desired train speed is sustained so that an express delivery schedule can be satisfied. There may be situations where doing so may cause excessive wear, excessive emissions or other undesirable effects. For example, if one cylinder of the diesel engine becomes inoperative, the predetermined mission priorities will determine whether the locomotive control system will provide additional fuel to the operating cylinders to compensate for the inoperative cylinder. Doing so may result in the engine exceeding an emission limit or may cause excessive wear on the engine. For a non-express service locomotive, the mission priority may be to operate at all times within an emissions limit, or within a required fuel consumption limit, etc. For such non-express service, the mission priorities may simply allow the peak engine output to drop when one engine cylinder becomes inoperative. The embodiment of the present invention may be utilized to allow a single locomotive to be reconfigured from a first set of mission priorities to a second set of mission priorities in response to a change in value of a configuration input. Such a change may involve modifying many end use device output responses, including diagnostic and alarm systems. Such changes are impractical for prior art locomotives, and thus mission priorities are sometimes compromised based upon the selection of an available locomotive. The embodiment of the present invention provides additional flexibility for a railroad dispatcher in matching available equipment with mission requirements.

In another embodiment, the configuration of an operator interface device may be changed in response to a configuration input variable. For example, different owners or operators may use various administrative and/or technology schemes, such as different emission profiles, different operator training profiles, usage profiles, tractive effort profiles, distributed power techniques, controlled tractive effort (CTE) profiles, radio communication frequencies, etc., that may be reflected in an operator interface device such as a touch screen input device. When attempting to operate a prior art locomotive on more than one railroad, problems would be encountered if the locomotive configuration were inconsistent with the mode of operation of the railroad. A simple example is the manner in which a railroad numbers the milepost markers along a rail line—some railroads use numbers and some railroads use letters. Another example is the manner in which a railroad configures its wireless radio communications between multiple locomotives in a train consist. With the embodiment of the present invention, a locomotive may include appropriate hardware and software to function properly on a plurality of railroads, with the activation of the proper configuration for a particular railroad being responsive to a configuration input variable such as an operator's selection. The operator input may include the operator's identity, such as by keying an operator identification number into a keyboard, swiping an identification card through a card reader, etc. The operator identity may be used as a configuration input variable, for example automatically limiting the power level, geographic region of operation, or configuration of locomotive interface devices in only those modes for which a particular operator has appropriate permissions.

As another embodiment of the invention, the computing device 22 may control one or more operations of the diesel-fueled power generating unit, such as a locomotive as a function of an emission profile, with the emission profile being made responsive to the configuration input value. An emission profile may be an operating profile that describes and defines the desired emissions performance of the locomotive verses power output. For example, an emissions profile may include one or more emissions requirements, such as a maximum allowable value of an emission. An emission requirement may set a maximum value of an oxide of nitrogen (NOx) emission, a hydrocarbon emission (HC), a carbon monoxide (CO) emission, and/or a particulate matter (PM) emission. Other emission limits may include a maximum value of an electromagnetic emission, such as a limit on radio frequency (RF) power output, measured in watts, for respective frequencies emitted by the locomotive. An emission requirement may be variable based on a time of day, a time of year, and/or atmospheric conditions such as weather or pollutant level in the atmosphere. It is known that emissions regulations may vary geographically across a railroad system. For instance, an operating area such as a city or state may have specified emissions objectives, and an adjacent operating area may have different emission objectives, for example a lower amount of allowed emissions or a higher fee charged for a given level of emissions. Accordingly, an emission profile for a certain geographic area may be tailored to include maximum emission values for each of the regulated emission including in the profile to meet a predetermined emission objectives required for that area.

The selection of a diesel-fueled power generating unit, such as a locomotive for a mission is complicated if the route crosses multiple areas with differing emissions requirements. In other embodiments, the emission profile or emission objective/characteristic may be defined as a function of the time of day, weather, daily emission rating/classification, train pull weight, consist configuration, movement plan, rail conditions, age or type of locomotive, and/or business objective of the railway system operator. An emission parameter of an operating locomotive may be compared to the emission profile for a particular area. A process executed by the computing device 22 is used to determine if an adjustment to one or more operating characteristics of the locomotive is required. The emission profile may be associated with a gaseous, liquid, or solid byproduct of combustion, with an acoustic energy emission, a reflective emission, such as provided by a device for reflecting or absorbing electromagnetic energy, vibration emissions, and/or an electro-magnetic energy emission, such as radio, infrared, and visible light emissions. For example, if the monitored emission parameter is a chemical or gas output of the diesel engine and it is monitored as being higher than specified by the emission objective, the computing device may execute instructions to control engine/fuel system end use devices such as to change the engine timing or fuel delivery schedule or another control intended to reduce the emissions being generated by the engine. Other corrective actions may include shutting down the engine, adjusting locomotive assignments within a consist or a train, adjusting one or more movement plans for a train, changing engine cooling, changing engine load or tractive effort, changing the engine speed, utilizing hybrid energy for motoring, or storing hybrid energy in an energy storage system. Such action may be taken to achieve the emission characteristic for a particular locomotive or may be taken on a system wide or sub-system basis in order to achieve an emission objective for a fleet of locomotives and trains operated by a railway systems operator operating in one or more operating areas.

In one embodiment, the present invention provides a method and apparatus for managing the emissions configuration of one or more diesel-fueled power generating units, such as locomotives depending upon a configuration input variable 35, such as the location in which the locomotives are located. For example, if a first operating area is an emission control area requiring a specified emission characteristic, the computing device 22 manages the operation of the locomotive (i.e., control outputs 13, 15, 17, 19, 21) in accordance with a first emission profile that will satisfy that objective when a location configuration input has a first value. When the configuration input 35 changes value in response to movement of the locomotive into a second operating area having a different emissions objective, the computing device controls the operation of the locomotive in response to a different emission profile, i.e., at least one different output value 13, 15, 17, 19, 21 for the same set of input values 27, 29, 31, 33.

Figure 3:
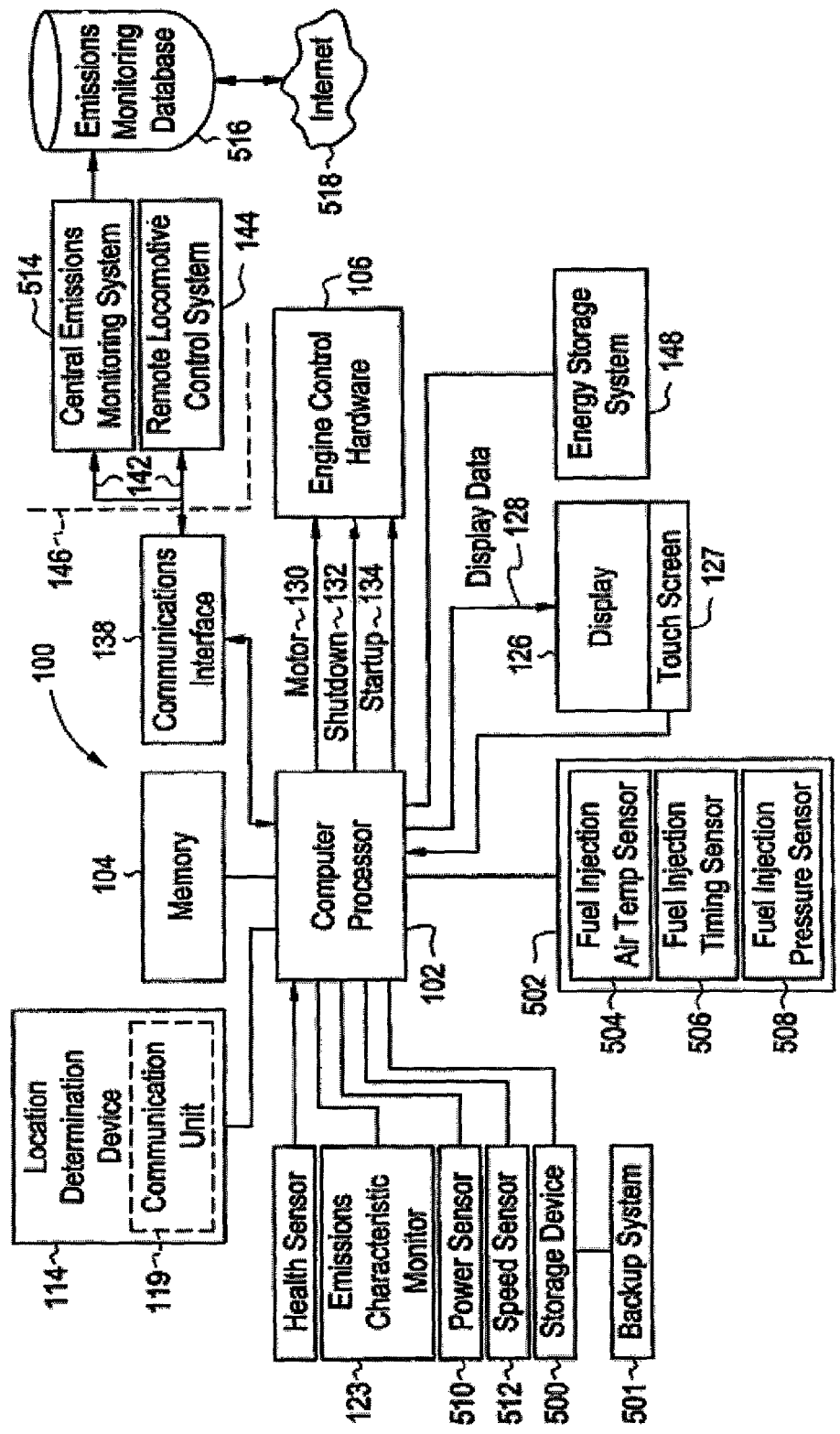
FIG. 3 is a block diagram of a diesel powered system in accordance with one aspect of the present invention.
Figure 4:
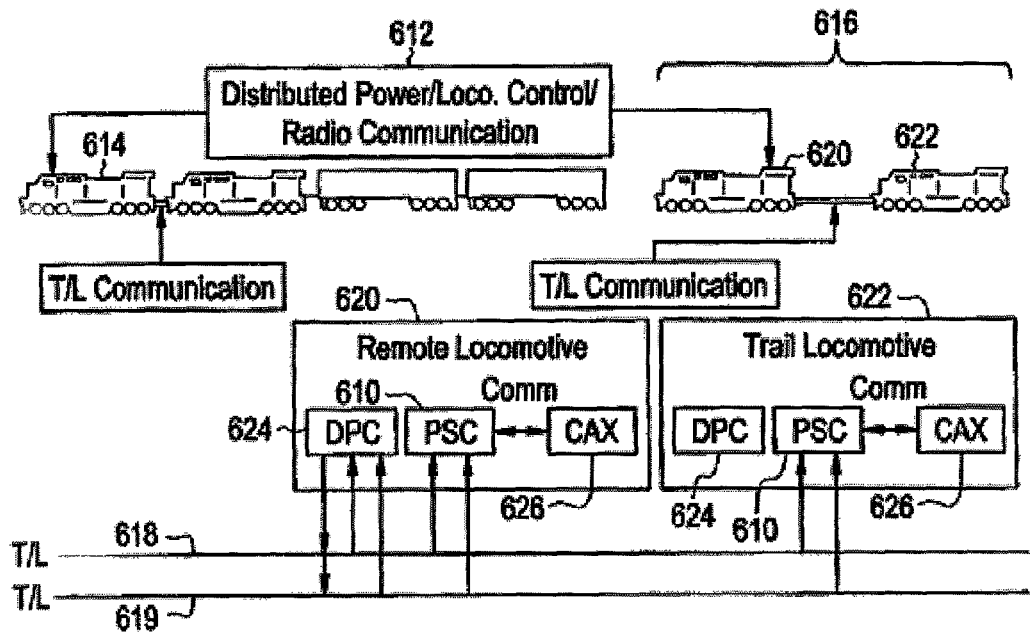
FIG. 4 is a schematic illustration of a train embodying aspects of the invention for selectably controlling the level of tractive effort produced by a diesel-fueled power generating unit.

In an aspect of the invention illustrated in FIG. 3, a diesel powered control system, such as a locomotive control system 100 may include an emission characteristic monitor 123 coupled to a computer processor 102 and monitoring emissions exhausted by the locomotive, such as oxides of nitrogen (NOx), carbon monoxide (CO), carbon dioxide (CO2) and particulates. The system 100 may also include an emission operating parameter monitor 502 coupled to the computer processor 102, for monitoring locomotive operating parameters indicative of emission profiles. The emission operating parameter monitor 502 may further include a fuel injection air temperature sensor 504, a fuel injection timing sensor 506, and a fuel injection pressure sensor 508 for monitoring these respective parameters. As known, such parameters may be used to calculate an emission level of a monitored engine. In another aspect, a horsepower, (or equivalent power measurement, such as megawatt-hours) produced by the locomotive and a speed of the locomotive may be monitored, for example, at certain times (such as every 0.1 hour) and/or at certain locations by power sensor 510 and speed sensor 512, respectively. As is known, such horsepower and speed information may be used to calculate an emissions profile of the locomotive over the period that such information is recorded. The emission profile may be correlated to location information to show where the locomotive was located when producing the emissions profile. Other parameters, such as fuel usage and engine exhaust characteristics may be monitored for example, by a fuel usage sensor and an engine exhaust characteristic sensor, respectively.

The diesel powered control system, such as the locomotive control system 100 is in communication with a central emissions monitoring system 514. The central emissions monitoring system 514 may be coupled to a central emission monitoring database 516, such as a central database used to monitor locomotive parameters as described in U.S. Pat. Nos. 6,301,531 and 6,263,265. The central emission-monitoring database 516 may have secured accessibility, for example, via the Internet 518. The central emissions monitoring system 514 may receive emission information from one or more locomotives over secure communication link 142 to track emissions of respective monitored locomotives. In an aspect of the invention, emission information provided by each locomotive may be stored in the database 516 in addition to, or instead of, being stored locally on the storage device of the locomotive. The information may be provide to the central emissions monitoring system 514 as the information is acquired, or the information may be uploaded from the locomotive on a periodic basis.

Advantageously, the system 100 provides an ability to operate a diesel-fueled power generating unit, such as a locomotive within different emission profile configurations (such as within a Tier II NOx limit) while in different regions. The system 100 may be configured to operate automatically with no operator input required to transition the locomotive to a different emission profile configuration. The system may be programmed to limit interruption of the locomotive performance while transitioning to a different emission profile configuration. The system 100 provides the ability to record and maintain a record of the date and time that a locomotive enters and exits a pre-defined region, and/or a record of various system operating parameters, such as parameters indicative of emission generated by the engine, for example. Memory 104 may be used to record portions (e.g. as measured by clock time, fuel consumed, location, etc.) of the locomotive operation in each available mode of operation, such as may be useful for subsequent tax reporting, billing or fleet management purposes.

In addition, no modification of engine control hardware is necessary. In the event of a malfunction of the configuration input device 34 (i.e., the location determination device 114), the system 100 may instruct the locomotive to revert to a default emissions profile, alternatively, the emissions profile of the last known configuration input may be used. Data may be redundantly stored or backed up and time stamped at periodic intervals. The configuration of the locomotive may be changed in response to a configuration input signal 35 that originates from the off-board central emissions monitoring system 514, such as when the emission data for the fleet or for the particular locomotive 100 requires or allows a change in the emission profile for the locomotive. Alternatively, the configuration of the locomotive may be changed by operator input, such as via input to a touch screen device 127.

In an aspect of the invention, the stored emissions information for each diesel-fueled power generating unit, such as a locomotive may be made available to a regulatory taxing agency, such as a taxing authority or environmental regulation authority, to verify emission compliance while the locomotive, or a fleet of locomotives, is operating in a certain area. Emission information may be provided for a locomotive as it crosses a boundary of a predefined region, and/or provided for the period of time that the locomotive operates within the region may be provided. For example, a state may require a certain emissions profile be maintained while a locomotive is operating with in the boundaries of the state, and may require reporting of emission information for each locomotive. The system 100 allows such reporting to be easily provided and may be made available to a regulatory agency of the state via the Internet.

In another embodiment, emissions from a plurality of mobile vehicles of a fleet may be measured, and data responsive to the measured emissions communicated to a central database. The received data may then be processed relative to a fleet emission requirement. The received data may be used to generate an operating instruction for operating the fleet in compliance with the emission requirement. The operating instructions may then be communicated to at least one mobile vehicle of the fleet. In an embodiment, the operating instruction may include a command to adjust an emission output. In another embodiment, an actual emission of each of the mobile vehicles versus a corresponding emission requirement for each of the mobile vehicles may be measured to calculate a difference between the actual emission and the corresponding emission requirement. The differences may then be summing over the fleet to determine fleet compliance with the fleet emission requirement. A plurality of emission requirements may be in effect for a respective plurality of geographic areas over which the fleet operates. Accordingly, the data may be processed relative to a respective emission requirement in effect for a geographic area in which a respective vehicle is operating.

The emission information gathered may be used for planning purposes for operation within emission controlled regions that allow accumulation of emission "credits" for operating at emission levels below maximum allowed emission levels. For example, emission credits generated by operating below maximum allowed emissions may be accumulated and applied to offset penalties that may be assessed for other locomotives operating above maximum allowed levels, so that overall fleet emissions in the region may be averaged to meet an emission requirement. For planning purposes, if a surfeit of credits has been built up, locomotives may be scheduled to operate in more fuel efficient modes that may generate emissions exceeding a maximum allowed level until the accumulate credits are exhausted. In an embodiment, credits may be traded among different rail road systems operating in different areas, such as different states and different countries. In yet another aspect, the emission information may be used to trade emission credits for the same locomotive being operated within a geographical area having an associated emission requirement. For example, while descending a grade in the operational area, the locomotive may be controlled to have an emission below a maximum allowed emission level for that area. During this time, emission credits may be accrued and these credits may be used to offset operations when an emission parameter is allowed to exceed a maximum value, such as when the locomotive is climbing a grade. Consequently, an average emission of the locomotive while in the area may be managed so that the average emission meets an emission requirement associated with the area.

An exemplary embodiment for a train utilizing multiple locomotives in a consist will now be described with reference to FIGS. 4-7. A propulsion system controller 610 (PSC) onboard each locomotive may be responsive to tractive-effort control signals generated in response to commands wirelessly communicated with locomotive communication equipment 612 (e.g., referred to in commerce as LOCOTROL® Distributed Power Communication Equipment) from a lead locomotive 614 relative to a remote consist 616. By way of example, consist 616 is shown to be made up of a remote locomotive 620 and a trail locomotive 622. It will be appreciated that the embodiment of the present invention is not limited to the consist arrangement shown, since many other consist arrangements may be provided depending on the specific train application. As will be described below, respective controllers on-board each locomotive, such as distributed power controller (DPC) 624, primary locomotive controller 626 (CAX), the PSC controller and the communication equipment may be configured with appropriate control algorithms to selectively limit the tractive effort provided by each locomotive of a consist upon receiving a configuration input signal.

Figure 6:
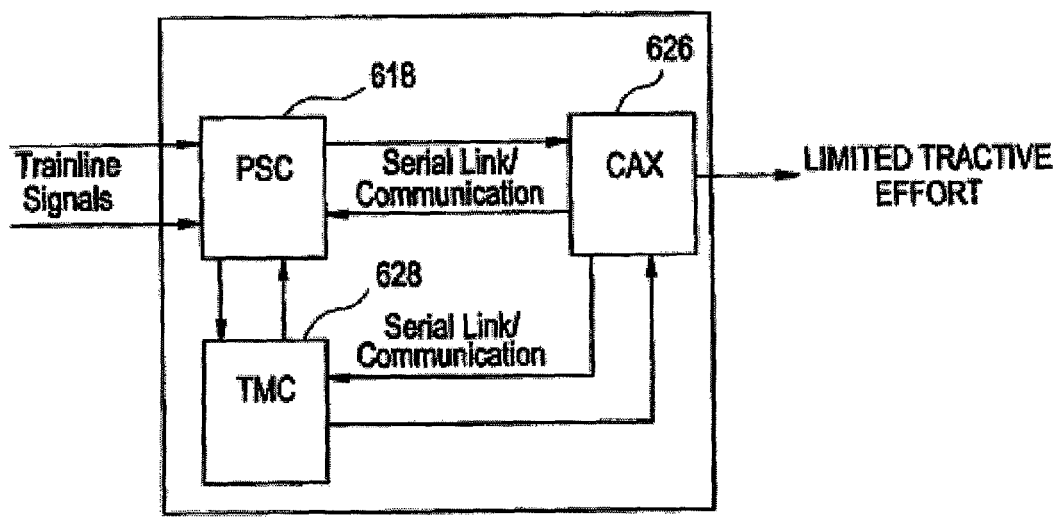
FIG. 6 is a block diagram of controllers providing selectable control of tractive effort for a diesel-fueled power generating unit.
Figure 5:
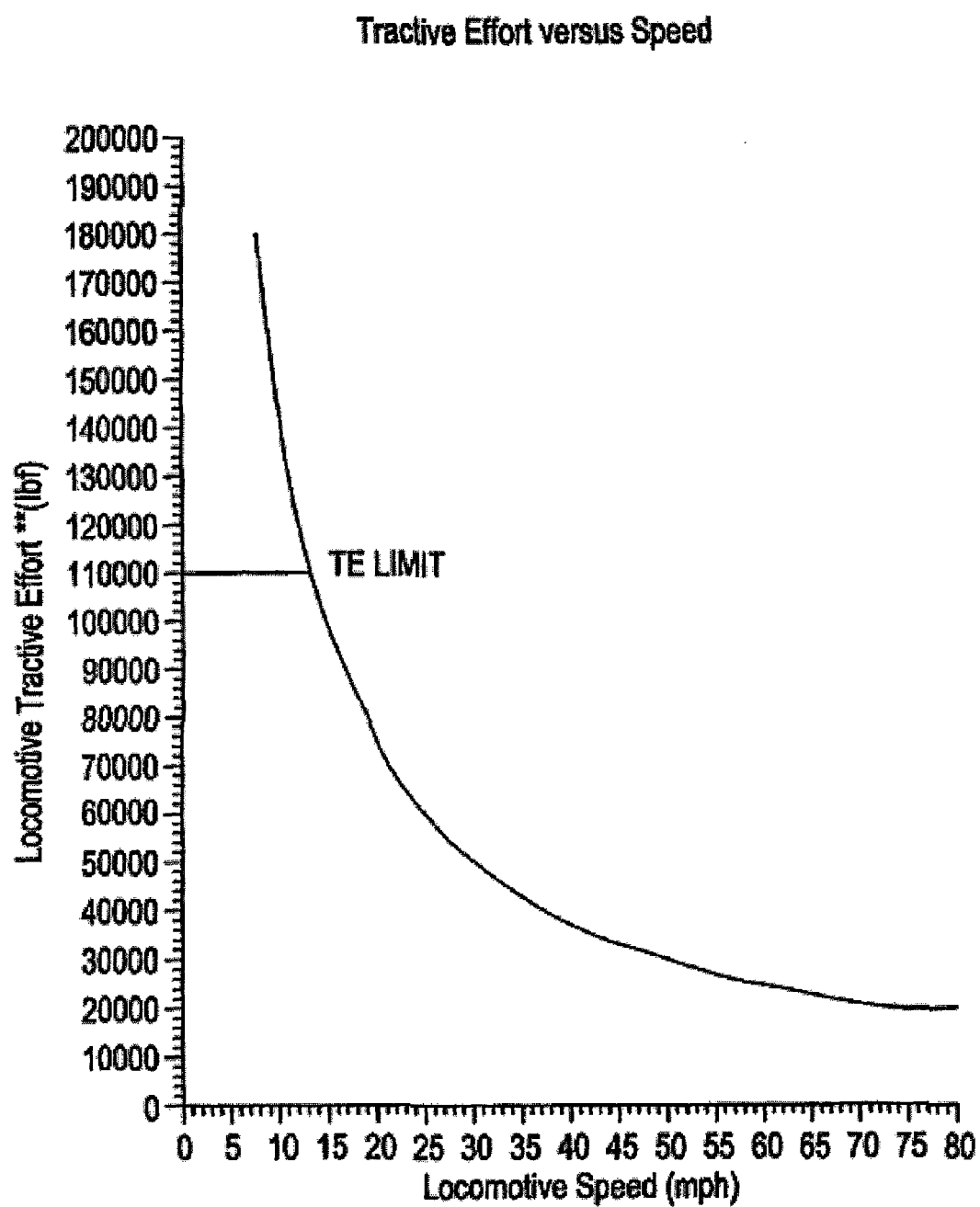
FIG. 5 is an exemplary plot of tractive effort as a function of speed for a diesel-fueled power generating unit with selectably controllable tractive effort.

In one exemplary embodiment, a locomotive controller upon receiving a configuration input signal directs a pair of locomotive train lines (such as lines T/L 618 and T/L 619) be energized (High) for limiting the total tractive effort of the locomotive to a value lower than the locomotive was originally designed to provide. As shown in FIG. 5, in an exemplary embodiment, the locomotive may be selectively limited to approximately 110,000 pounds (approximately 4.99e+004 kilograms) of tractive effort for all six wheel-axles instead of the normal 180,000 pounds (8.165e+004 kilograms) of tractive effort. In the exemplary embodiment, the communication equipment may be configured by way of the DPC controller onboard the remote locomotive to energize the train lines to initiate the limited tractive effort (TE) mode of operation. In one exemplary embodiment, the PSC controller 610 would detect when both train lines are active and interpret this condition as a command for limited tractive effort operation. A reduced tractive effort command would then be imposed on the respective traction motor controllers (TMC) 628, as illustrated in FIG. 6. Alternatively, the tractive effort of the lead locomotive could be increased relative to the remote locomotive so that a differential in tractive efforts is developed between the lead and remote locomotives in a LOCOTROL distributed power train. This differential helps keep unevenly loaded railroad cars in a train on the railroad track when the train encounters curvy and hilly track conditions.

In order for a remote locomotive to reduce tractive effort, that locomotive would initially determine whether it is equipped (e.g., via hardware, software or both) to operate in a reduced tractive effort mode, and provide a signal to other locomotives that indicates that it is equipped with selectable tractive effort capability. Similarly, a road number may be selected from a pre-defined list of road numbers indicating that the unit is equipped with selectable tractive effort. In one exemplary embodiment, an appropriate controller may monitor both the road number of the locomotive and/or the presence or absence of the signal of selective tractive effort capability to determine whether or not the locomotive is equipped to operate in a reduced tractive effort mode. At distributed power link time, the operator will select either the full tractive effort or reduced tractive effort mode. If the reduced tractive effort mode were selected, the distributed power unit on-board the lead locomotive would issue a configuration input signal instructing the remote DPC to operate in the reduced tractive effort mode. Assuming the remote distributed power units are configured for reduced tractive effort operations, the DPC controller 624 on-board the remote would then energize trainlines, such as trainlines 618 and 619 (two trainlines may be used for redundancy). In one exemplary embodiment, each locomotive in consist 616 would operate in reduced tractive effort when they detect that either or both of these trainlines have been energized, i.e., they receive the appropriate configuration input signal. Remote units that are equipped with the ability to operate in reduced tractive effort may default to this mode of operation for safety reasons. Remote units would return to normal levels of tractive effort when they detect that both trainline 618 and trainline 619 are de-energized. For example, this could happen when the operator selects the full tractive effort mode of operation and the remotes receive the command from the lead unit to operate in full tractive effort mode and both trainlines 618 and 619 are de-energized.

In one exemplary embodiment, the locomotive controller is configured to restrict the tractive effort, not necessarily the horsepower delivered by the locomotive. This allows normal performance at higher train speeds. As suggested above, two train lines may be used in order to provide a redundant, safe connection. It will be appreciated by those skilled in that art, that many communication techniques including wireless communication techniques may be used to communicate the desired operational mode.

In operation, controlled tractive effort (CTE) is a feature that selectively reduces tractive effort of locomotives that may be used as pushers or pullers, or both, in distributed-power mode. It is contemplated that one or more locomotives configured with CTE capability may be placed at the rear of the train depending, for example, on tonnage and controlled by a lead locomotive equipped with the distributed-power equipment, such as LOCOTROL® distributed-power equipment. It is further contemplated that if one or more pushers are used, each of them would be CTE-equipped and the controlling unit at the head end could be any DP-equipped unit. For example, assuming an AC4400CTE locomotive is used in a pusher application in distributed-power mode, its tractive effort may be selectively reduced from 145,000 pounds (6.577e+004 kilograms) at 11 mph (17.7 kilometers/hour) to 110,000 pounds (approximately 4.99e+004 kilograms) at 11 mph (17.7 kilometers/hour). The tractive effort reduction would essentially reconfigure the ACT4400CTE locomotive equivalent to a Dash-9 locomotive in tractive effort, and thus advantageously make such AC locomotive practical for applications such as DP Push/Pull on freight trains that are used both in heavy hauling applications and in lighter hauling applications. Thus, in one aspect of the present invention, users of fleets of locomotives may be able to mix and match the tractive effort of the locomotives to the actual needs of any given train without having to wait for an available locomotive model capable of delivering the required tractive effort. Thus, the user would be able to use locomotives such as the ACT4400 CTE in multiple applications, including applications where a lesser rated locomotive (from the point of view of tractive effort capability) would be used without having to wait for availability of the lesser rated locomotive. Thus, aspects of the present invention allow the users of fleet of locomotives for efficiently increasing the versatility of operation of such fleets.

Figure 7:
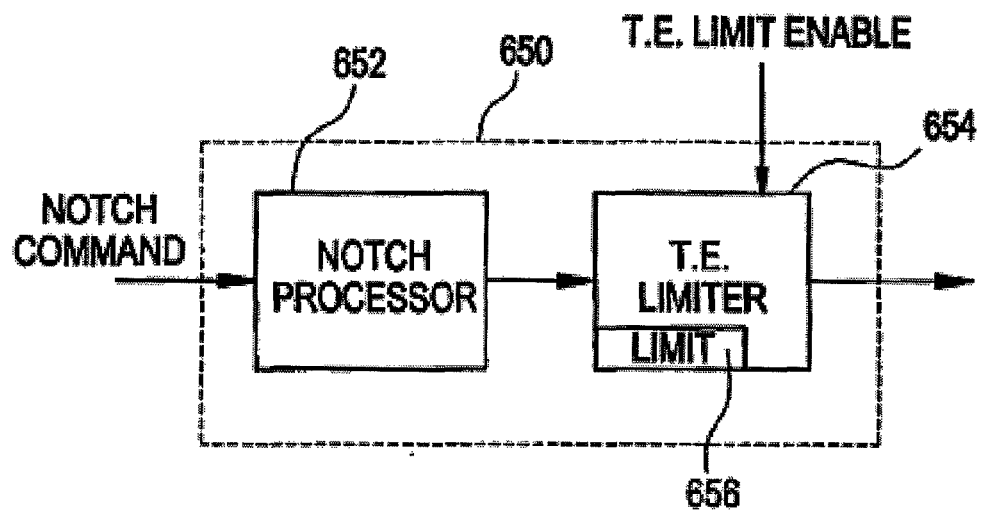
FIG. 7 is a block diagram of an exemplary tractive effort processor.

FIG. 7 is a basic block diagram used to facilitate understanding of operational aspects of the embodiment of the present invention. As shown in FIG. 7, a tractive effort processor 650 includes a notch processor 652 configured to generate a tractive effort consistent with a respective notch command supplied to the processor 652. A tractive effort limiter 654 is configured to limit the tractive effort using, for example, a tractive effort limit stored in a memory 656. In operation, upon activation of trainlines TL 618 and TL 619, the traction processor limits its total tractive effort reference in each motoring notch to the amount desired for limited tractive effort operation. The tractive effort reference may then be appropriately distributed (e.g., using standard optimization techniques) to each wheel axle based on the performance capability of each axle. Each axle and processor essentially comprises a closed loop mechanism that continuously processes feedback performance data, which is then used to re-allocate the distribution of tractive effort to each axle to best achieve the reference value of tractive effort. It will be appreciated that if axle capabilities are degraded due to conditions such as poor rail condition, thermal limitation or horsepower limitations, the reference may not be achieved even with optimal re-allocations of tractive effort to other axles. The operator may be informed of the limited tractive effort mode of operation by way of a summary message that may be displayed in a suitable display unit. The summary message may provide information indicative of whether or not tractive effort reduction is enabled, such as "TE Limited: TE Reduction Enabled."

The embodiments of the invention can also be embodied be implemented using computer programming or engineering techniques including computer software, firmware, hardware or any combination or subset thereof wherein the technical effect is to provide a system for monitoring and controlling locomotive engine emissions as described above. Any such resulting program, having computer-readable code means, may be embodied or provided within one or more computer-readable media, such as memory 24, thereby making a computer program product, i.e., an article of manufacture, according to the embodiment of the invention. The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network. The embodiment of the invention may comprise one or more processing systems such as a central processing unit (CPU), memory, storage devices, communication links and devices, servers, I/O devices, or any sub-components of one or more processing systems, including software, firmware, hardware or any combination or subset thereof, which embody the embodiment of the invention as set forth in the claims. User input may be received from a keyboard, mouse, pen, voice, touch screen, switch or any other means by which a human can input data, including through other programs such as application programs. One skilled in the art of computer science will easily be able to combine the software created as described with appropriate general purpose or special purpose computer hardware to create a computer system or computer sub-system embodying an exemplary method embodiment of the invention.

Figure 9:
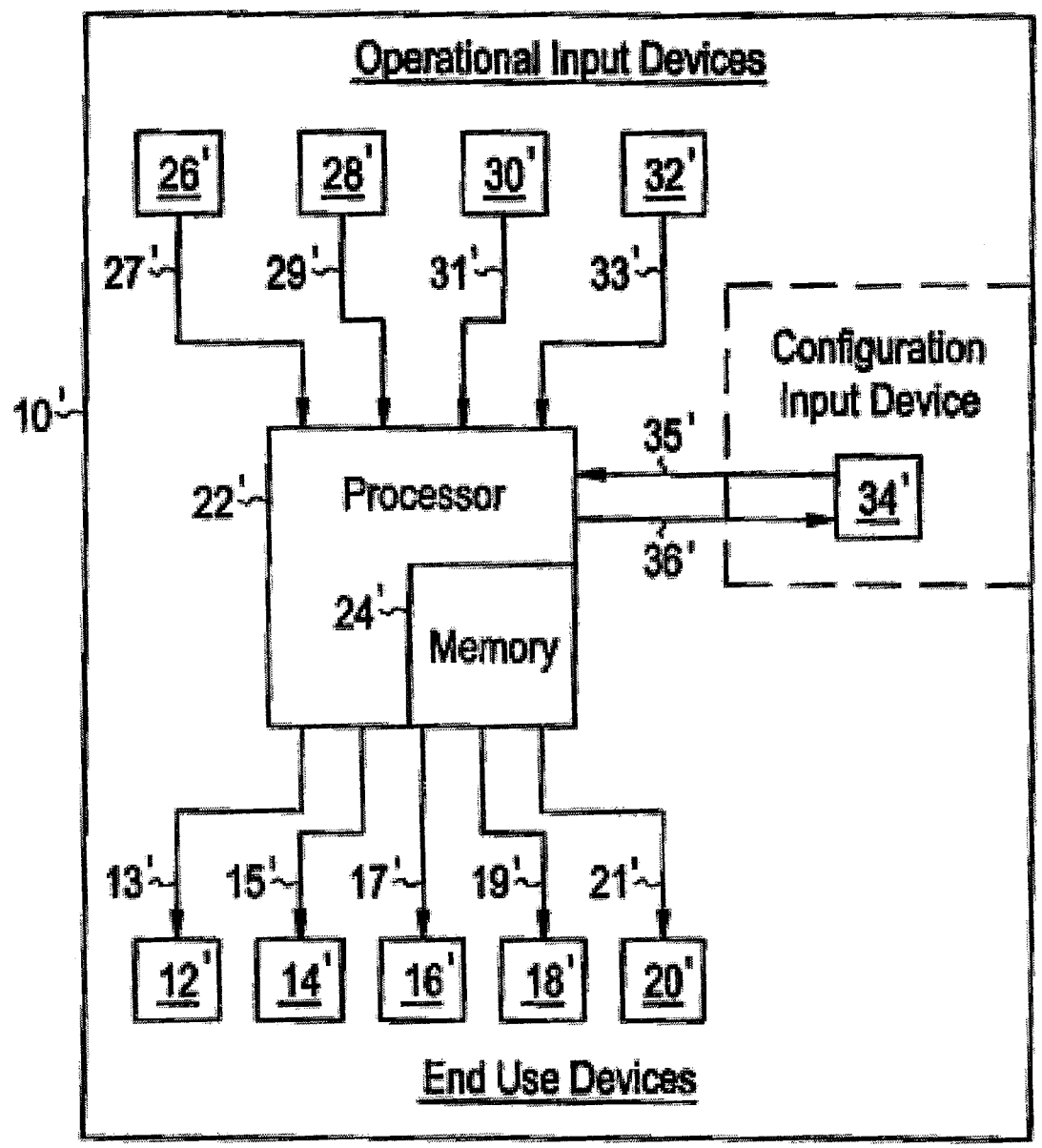
FIG. 9 is a block diagram of a diesel powered system of a diesel-fueled power generating unit including a configuration input.

FIG. 9 illustrates one embodiment of a configurable diesel powered system to control engine emissions of a diesel-fueled power generating unit, such as a locomotive 10'. The locomotive 10' includes a locomotive engine operating on at least one fuel type. The locomotive engine operates on each fuel type on one of an instantaneous or a duty cycle basis. For example, if the processor 22' (discussed below) decides to operate on 80% of fuel A and 20% of fuel B, this may correspond to an instantaneous mixing of 80% of fuel A and 20% of fuel B based upon respective valve signals to respective fuel tanks holding fuel types A and B, or a duty cycle mixing, such as operating on fuel A for 80% of the time, while operating on fuel B for 20% of the time, for example.

The system illustratively includes a processor 22' carried on the diesel-fueled power generating unit, such as a locomotive 10', a plurality of locomotive operational input devices 26', 28', 30', 32' including sensors 26', 28', 30' for respective end use devices 12', 14', 16' (e.g., fuel tanks) for each fuel type. In an exemplary embodiment, each end use device 12', 14', 16' (e.g., fuel tank) may hold more than one fuel type at different times during operation of the locomotive 10'. Each sensor 26', 28', 30' may be used to identify which fuel type is within each end use device 12', 14', 16' (e.g., fuel tank) at different times. The sensors 26',28',30' may include sensors which identify a fuel type within each end use device 12', 14', 16' (e.g., fuel tank) based upon information provided to the locomotive 10', including manual sensors, electronically transmitted fuel type information from a fuel source such as a railroad or adjacent locomotive, and location information where the end use device 12', 14', 16' (e.g., fuel tank) is filled. The processor 22' may include fuel type information for each location where filling takes place. The sensors 26',28',30' may further identify a fuel type within each fuel end use device 12', 14', 16' (e.g., fuel tank) based upon properties of the fuel type within each end use device 12', 14', 16' (e.g., fuel tank) detected by the locomotive. Such properties may include physical properties of each fuel type, including viscosity and density, for example, or chemical properties of each fuel type, including fuel value, for example. These properties of each fuel type may be detected by sensors or devices within the locomotive. The sensors 26',28',30' may further identify a fuel type within each end use device 12', 14', 16' (e.g., fuel tank) based upon locomotive performance characteristics, such as the locomotive engine performance for example, while assessing the input and output properties of each fuel type to the engine. For example, for the locomotive engine to produce 1000 HP, the fuel regulator includes a stored a fuel A input requirement of 200 gallons (757.1 liters), but a fuel B requirement of 250 gallons (946.4 liters). Accordingly, the fuel type within each end use device 12', 14', 16' (e.g., fuel tank) may be identified by assessing the fuel input and output characteristics with the locomotive engine characteristics, for example. A locomotive consist including locomotives with multiple fuels has greater flexibility in meeting a power demand than locomotives with a single fuel, as several combinations of power distribution from each locomotive based on utilization of respective fuel types may be performed to meet a power demand. Although FIG. 9 illustrates one type of sensor 26', 28',30', such as sensors receiving electronically transmitted information from fill-up stations, for example, any sensors discussed above may be utilized in the locomotive 10'. The operational input devices 26',28',30',32' are illustratively coupled with the processor 22' to generate operational input signals 27',29',31',33' to the processor.

More particularly, a plurality of end use devices 12', 14', 16',18',20' include fuel tanks (e.g., end use devices 12', 14', 16'—for each respective fuel type on the diesel-fueled power generating unit, such as a locomotive. Although FIG. 9 illustrates three fuel tanks as the end use devices 12', 14', 16' for two respective fuel types and one fuel type-mix, such as E-80, for example, any number of fuel tanks and respective fuel types may be utilized. Each end use device 12', 14', 16', 18', 20' is controlled by the processor 22' to subsequently control the engine emissions to correspond to an engine emission profile, as discussed below.

As illustrated in FIG. 9, a configuration input device 34' is coupled with the processor 22' to generate a respective configuration signal 35' indicative of each particular location 9',11' (FIG. 12) of the diesel-fueled power generating unit, such as a locomotive along a locomotive track 8'. The configuration signal 35' is different than the operational signals 27',29',31',33' to be transmitted to the processor 22'. Alternatively, as illustrated in FIG. 9, a remote processor 37' in wireless communication with the processor 22' may transmit mission information for the diesel-fueled power generating unit to the processor. The mission information may include respective configuration signals 35' for each particular location 9',11' of the diesel-fueled power generating unit along the track 8'. Upon transmitting the mission information to the processor 22', the mission information may be stored in an internal memory 41' of the processor 22'. As discussed below, at each particular location of the diesel-fueled power generating unit along the predetermined course, the processor is responsive to the operational input devices, and a respective configuration signal from the internal memory 41' for each particular location, to generate at least one set of control signals to the end use devices to limit the total engine emissions of each fuel type to a respective stored engine emission profile for each location along a predetermined course.

Additionally, the processor 22' internal memory 41' may store health status information of the engine and a time duration since the most recent engine service. The plurality of operational input devices 26',28',30',32' may communicate an engine wear factor of each respective fuel type to the processor 22', and the processor may generate a plurality of control signals to the end use devices 12',14',16',18',20' to maintain a minimum health status of the engine based upon the engine wear factor of each respective fuel type. The cost of each fuel type may vary depending on their respective engine wear factor, as appreciated by one of skill in the art. For example, if the health status information reveals that a health status below a minimum threshold, the processor 22' may generate a set of control signals to utilize those fuel types having the lowest engine wear factor, despite the fact that such fuel types may have increased cost.

Additionally, as illustrated in FIG. 9, the configurable diesel powered system includes a memory 24' coupled with the processor 22' to store a respective engine emission profile for each configuration signal 35' indicative of each particular location 9',11' (FIG. 12) of a diesel-fueled power generating unit, such as a locomotive 10' along the locomotive track 8'. The processor 22' is responsive to the operational input signals 27',29',31',33', configuration signals 35', and the memory 24' to generate a set of control signals 13',15',17',19',21' to the end user devices 12',14',16' for limiting the total engine emissions for all fuel types to the stored engine emission profile for each configuration signal indicative of each particular location 9',11' (FIG. 12) of the locomotive 10' along the locomotive track 8'.

In an additional exemplary embodiment, the set of control signals 13',15',17',19',21' may limit one of the total fuel efficiency of all fuel types to a stored engine efficiency profile; the total output power of the engine to a stored output power profile, and a time of arrival for the diesel-fueled power generating unit along the predetermined course to a time of arrival restriction for each configuration signal indicative of each particular location of the diesel-fueled power generating unit along the predetermined course. In the exemplary embodiment, limiting the total fuel efficiency of all fuel types and limiting the total power output of the engine may be performed while maintaining the engine emissions at a constant level. Additionally, in the exemplary embodiment of the present invention, and limiting the time of arrival for the diesel-fueled power generating unit along the predetermined course may be performed while maintaining the engine emissions and fuel efficiency at constant levels.

Upon the plurality of end use devices 12',14',16' receiving the set of control signals 13',15',17',19',21' to limit the total engine emissions of all fuel types, a respective mechanical lever 43' positioned proximate to each of the end use devices 12',14',16' may be used to control the flow of each respective fuel type to the engine in limiting the total engine emissions to a respective stored engine emission profile. The respective mechanical lever 43' may be manually or automatically operated, as appreciated by one of skill in the art.

The total engine emissions of all fuel types is a weighted sum, with weighted coefficients, for each respective engine emission of each respective fuel type. The processor 22' generates each set of control signals 13',15',17',19',21' based upon the weighted coefficients. The weighted coefficients for each respective fuel type are based upon each respective stored engine emission profile for each particular location 9',11', the individual engine emission of each respective fuel type, and the operational input signals indicative of the availability of each fuel type, such that the total engine emissions are limited to the stored engine emission profile for each configuration signal and particular location of the diesel-fueled power generating unit, such as the locomotive. For example, in an exemplary embodiment of the present invention, if a locomotive enters the state of California, with a low engine emission profile, the weighted coefficients for fuels types A and B may change from 0.5 and 0.5 to 0.8 and 0.2, since the individual engine emission profile of fuel type A is greater than fuel type B and a reduced weighted coefficient for fuel B may be necessary to limit the total engine emissions to the reduced engine emission profile for California. In addition, in an exemplary embodiment of the present invention, if the operational input signals revealed a fuel shortage for fuel B, the weighed coefficients for fuel types A and B may become 0.95 and 0.05 upon entering California, so to conserve fuel type B. In an additional exemplary embodiment of the present invention, if a locomotive was leaving the state of California and entering a region with an increased stored engine emission profile, the weighted coefficients for fuel types A and B may change from 0.5 and 0.5 to 0.2 and 0.8, based upon the larger individual emission profile for fuel type B, as the increased engine emission profile outside California permits an increased total engine emission output through increasing the weighted coefficient for fuel type B.

In an exemplary embodiment of the configurable locomotive system, including a diesel injection system, each fuel type typically is returned to its respective tank as only a portion of each fuel is used during combustion. In an exemplary embodiment of the configurable locomotive system, the weighted coefficients of each fuel type may be changed by computing a time integrated ratio of the respective engine emission output (or fuel efficiency) of each fuel type, and switching between fuel types based on the computed time integrated ratio. For example, in the previously discussed exemplary embodiment of a locomotive entering the state of California, in which the weighted coefficients for fuels types A and B changed from 0.5 and 0.5 to 0.8 and 0.2, the weighted coefficient for fuel type A could be increased and the weighted coefficient for fuel type B could be decreased based upon the computed time integrated ratio of fuel types A and B over the locomotive trip. By computing the time integrated ratio of the respective engine emissions (or fuel efficiency) over the locomotive trip, this advantageously allows on-board diagnostics to be performed to monitor the respective engine emissions (and fuel efficiency) of each fuel type, to obtain early warning of any engine emission (and fuel efficiency) degradation, and continuously update the status of each trip to comply with the goals and intent of each mission.

Figure 11:
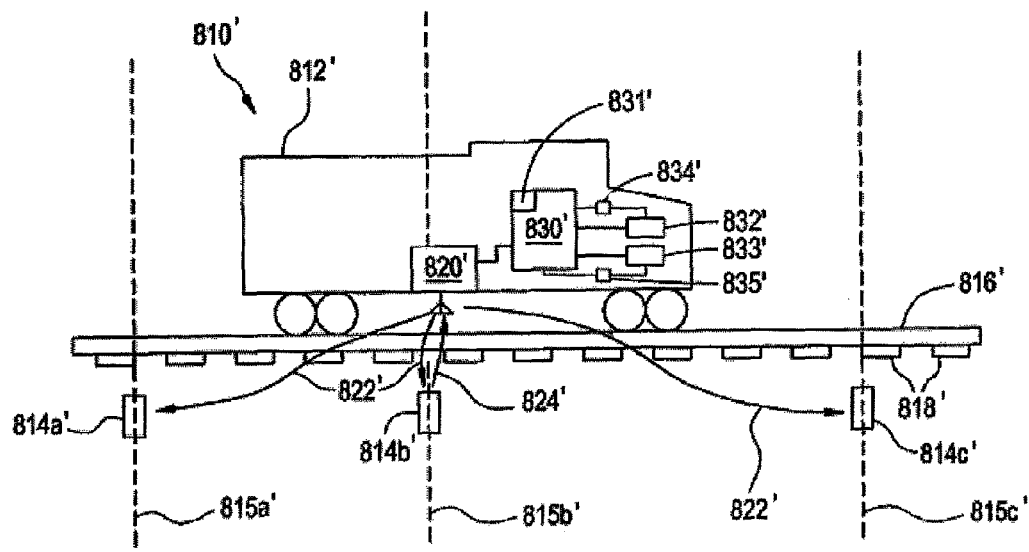
FIG. 11 is an illustration of operating a diesel-fueled power generating unit as a function of the location of the diesel-fueled power generating unit according to one embodiment of the invention.

The configuration input device 34' may be a position determining device. In an exemplary embodiment of the present invention, the configuration input device may include an automatic device such as a GPS (Global Positioning System) device and a wayside device, such as a transponder device, as illustrated in FIG. 11. An exemplary embodiment of such a transponder includes a Balise, as appreciated by one of skill in the art. Additionally, wayside devices include equipment positioned adjacent to the railroad, such as an axle counter, including a hotbox detector, for example, as appreciated by one of skill in the art. In an exemplary embodiment of the present invention, a hotbox detector including a transponder, detects the number of heated axles of the diesel-fueled power generating unit passing by the hotbox detector, and the transponder transmits a radio frequency signal with the accompanying mile marker location of the hotbox detector and the number of heated axles passing by the detector to the diesel-fueled power generating unit processor, thereby conveying position information. Each diesel-fueled power generating unit relates the received position information with its approximate current position to decipher if the received position information pertains to that specific unit. For example, if a diesel-fueled power generating unit is traveling from Jacksonville to Miami, it should receive position information consistent with this route and its current time of travel along the route, such as a mile marker proximate to Daytona Beach after forty minutes of travel, for example. Additionally, the position determining device may include an axle speed sensor, in which the diesel-fueled power generating unit processor integrates the axle speed received from the axle speed sensor over the time duration of the mission to decipher the current position of the diesel-fueled power generating unit. Additionally, the position determining device may include a wireless system including a radio transmitter or differential transmitter including operating specifications conforming to IEEE 802.11b (i.e., Wifi), for determining the cellular area or railroad yard area location of the diesel-fueled power generating unit, as appreciated by one of skill in the art. Other such wireless systems for the position determining device include a leaky coax, a slotted waveguide, and Doppler radar, or any other wireless system appreciated by one of skill in the art. Additionally, an imaging device, such as a camera, may perform image recognition of an upcoming mile marker or known landmark stored in the diesel-fueled power generating unit processor, for determining the location of the unit. Additionally, the position determining device may include the diesel-fueled power generating unit operator manually recognizing an upcoming mile marker or landmark along the predetermined course.

FIG. 11 shows a system 810' for controlling a locomotive operating condition, such as an emission parameter, in response to information encoded in transponders 814a', 814b', 814c' positioned along the track 816'. For example, the transponders 814a', 814b', 814c' may be positioned at predetermined boundaries 815a', 815b', 815c' to identify the boundary to a locomotive 812' passing the boundary 815a', 815b', 815c'. Transponders 814a', 814b', 814c', such as AEI tags (commercially available, for example, from Transcor, Incorporated) may be positioned in the bed of the track 816' at a location where a locomotive operating condition is desired to be controlled. The transponder 814' may be attached to a tie 818' located at an entrance to a rail yard area to limit the speed of locomotive 812'. The locomotive 812 may be equipped with a transponder reader 820' to read the information encoded in each transponder 814a', 814b', 814c' that locomotive 812' passes while traveling along the track 816'. While the following describes a reader 820' located on the locomotive 812', it should be understood that the reader 820' may be installed on any car or locomotive on a train. In some instances, the locomotive 812' operates without an attached car or another locomotive, and thus the locomotive 812' itself then constitutes the train. The reader 820' may be configured to provide control information read from a transponder 814a', 814b', 814c' to a controlling locomotive of the train, or to a remote control operator.

In one embodiment, the reader 820' may radiate a radio frequency (RF) activation signal 822' that is received by the transponder 814b'. The activation signal 822' provides sufficient energy to the transponder 814b' to allow the transponder 814b' to radiate a transponder signal 824' back to the reader 820'. The transponder signal 824' may typically be an RF signal having a frequency different than that of the activation signal 822'. The transponder may also be powered by another suitable source of power, such as batteries, solar power, or a line to a power source. Typically, the reader must be located within a suitable detection distance from the transponder, for example, within 10 feet (3.048 meters), to receive the transponder signal 824'. Accordingly, transponders may need to be spaced at distances greater than such detection distance to prevent interference among transponders. Unique identifiers for the communication of each transponder with the reader may also be used to allow for closer spacing of transponders.

The reader 820' is in communication with an onboard control system 830', such as a locomotive control unit (LCU) that controls the locomotive 812'. After reading a transponder, the reader 820' provides the control information encoded in the transponder signal 824' to the onboard control system 830' to control the operating parameters of the locomotive 812'. For example, the reader 820' may provide location determination information to a memory 831' within the onboard control system to retrieve an engine emission profile from the memory for that particular location, for example. The onboard control system 830' may then send control signals including valve signals to at least one fuel tank 832',833' holding a respective fuel type among a plurality of types of fuel, to limit the total engine emissions for the plurality of fuel types to the engine emission profile for each particular location. As discussed above, in an exemplary embodiment, each fuel tank 832',833' may hold different fuel types at different times during operation of the locomotive, and respective sensors 834',835' may be used to identify the particular fuel type in each respective fuel tank 832',833'. Each sensor 834',835' includes one of several versions, as discussed above. Alternatively, the memory 831' may retrieve operating characteristic limit information for the locomotive at each particular location, including mileage limits, engine horsepower output limits, and other such limits appreciated by one of skill in the art. The locomotive 812' may then maintain these same operating parameters until another transponder 814c' is passed, and new control information is received. The control information received from each transponder 814a', 814b', 814c' may be directly provided to the onboard control system 830' for automatic control of the locomotive 812'.

In an aspect of the invention, two or more sequentially positioned transponders may be configured to provide control information dependent on the direction of locomotive travel with respect to the transponders. For example, transponder 814a' may comprise a pair of transponders positioned at the boundary 815a' to provide control information to control the operating parameters of the locomotive 812' depending on a direction of travel along the rail, such as if the locomotive 12' is entering or leaving an area 817' bounded by the boundary 815'. A boundary may include a state line between two states requiring different emission profiles. As the locomotive 812' detects leaving one state and entering an adjacent state by passing, for example paired transponders in a certain direction, the locomotive 812' may be instructed to change an emissions parameter corresponding to the requirements of the state it has just entered. In another aspect of the invention, the reader 820' may be mounted on a different locomotive or rail car of a train of which the locomotive 812' is a member. For example, the locomotive 812' being controlled may be a member of consist of a train, wherein the different locomotive is also a member of the consist. The different locomotive detects its location and transmits the location information to the locomotive 812' for controlling the locomotive's 812' emissions responsive to the location information provided by the different locomotive.

The configuration input device 34' including a position determining device, may be an automatic device, such as a GPS device and transponder device discussed above, or a manual device featuring an operator panel for manually inputting a particular configuration signal 35' upon the locomotive entering a particular region.

Figure 10:
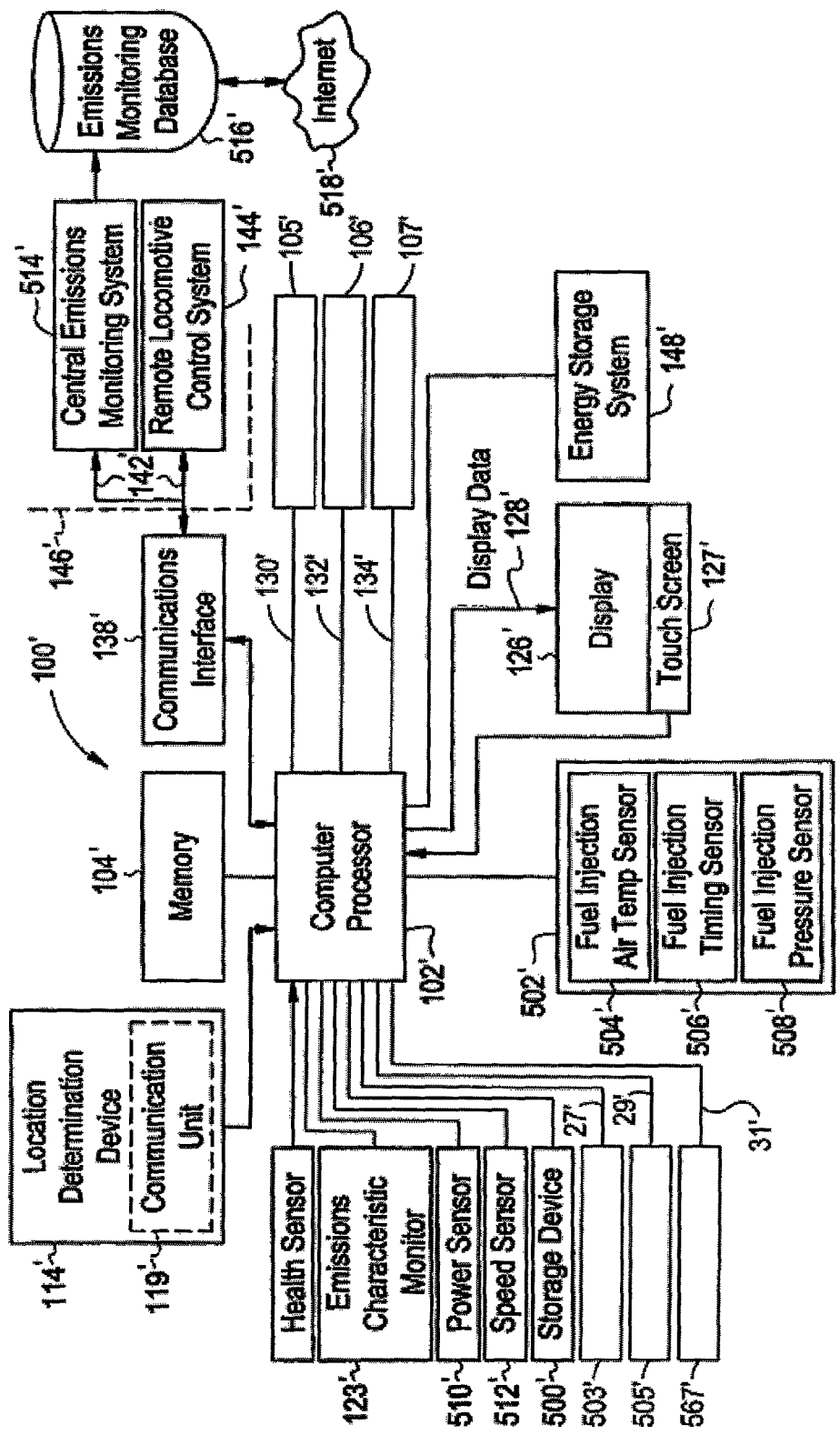
FIG. 10 is a block diagram of a diesel powered system in accordance with one aspect of the present invention.

As illustrated in FIG. 10, a diesel-fueled power generating unit system, such as a locomotive system 100' further includes an emission parameter monitor 502' coupled to the processor 102' to monitor values of an emission parameter of the locomotive indicative of the total engine emissions of all fuel types. In response to the emission parameter values from the emission parameter monitor 502', the processor 102' illustratively sends secondary control signals 130',132',134' to the end use devices 105',106',107' to limit the total engine emissions of all fuel types to the stored engine emission profile for each configuration signal 35' indicative of each particular location 9',11' of the locomotive 10' along the locomotive track 8'. As further illustrated in FIG. 10, the operational input signals 27',29',31' from sensors 503',505',507' include flow-rate signals indicative of the fuel volume of each respective fuel type remaining in each fuel tank 105',106',107'.

For stationary applications, upon commissioning equipment including a configurable diesel powered system, such as a locomotive system at a destination location, the configuration input device 34' will generate a configuration signal 35' indicative of the destination location for the equipment to self-configure the equipment for a particular engine emissions profile upon arrival at the destination location.

Figure 12:
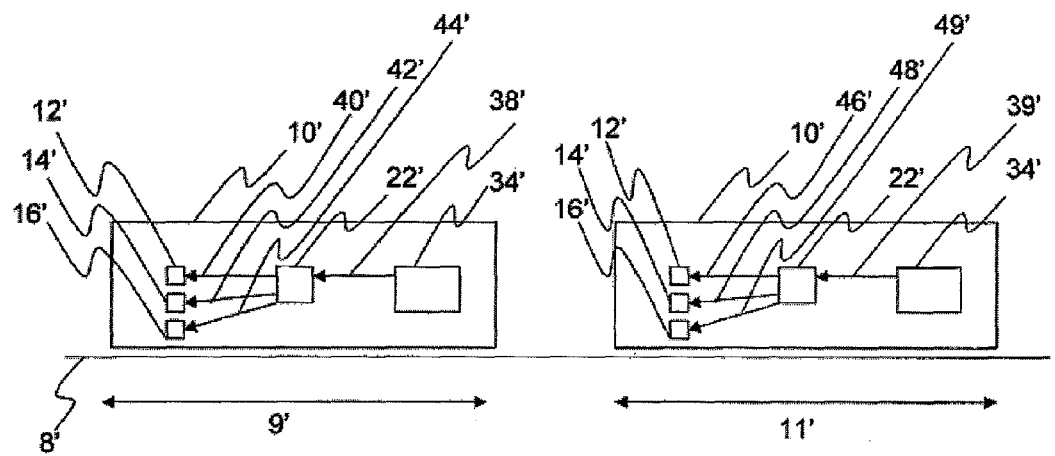
FIG. 12 is an illustration of operating a diesel-fueled power generating unit as a function of the location of the diesel-fueled power generating unit according to one embodiment of the invention.

As illustrated in FIG. 12, the diesel-fueled power generating unit, such as a locomotive 10' travels between a first location 9' and a second location 11' along the locomotive track 8'. Upon reaching the first location 9', the processor 22' is illustratively responsive to a first configuration signal 38' from the configuration input device 34' to generate a first set of control signals 40', 42', 44' including a first set of valve signals to each respective fuel tank (e.g., end use devices 12', 14', 16') to limit the total engine emissions of all fuel types to a first stored engine emission profile. Upon reaching the second location 11', the processor 22' is responsive to a second configuration signal 39' from the configuration input device 34' to generate a second set of control signals 46', 48', 49' including a second set of valve signals to each respective fuel tank (e.g., end use devices 12', 14', 16') to limit total engine emissions of all fuel types to a second stored emission profile.

FIG. 10 illustrates one embodiment of a configurable diesel powered system 100' for controlling operating characteristics of a diesel-fueled power generating unit. The diesel-fueled power generating unit includes an engine operating on at least one fuel type. The diesel-fueled power generating unit for which the configurable vehicle system 100' may be employed may be a locomotive, a marine vehicle, or an off-highway vehicle (OHV), for example. Although FIGS. 9-12 illustrate a configurable vehicle system as applied to a locomotive, the configurable diesel powered system may be equally applied to marine vehicles and OHV's, for example.

The system 100' illustratively includes a processor 102' carried on the diesel-fueled power generating unit, and a plurality of operational input devices 503',505',507' including sensors 503',505',507' for a respective fuel tank 105',106',107' for each fuel type. The operational input devices 503',505', 507' may include flowrate sensors to measure the flowrate of each respective fuel type and communicate this information to the processor 102' in the form of operational input signals 27',29',31', in addition to the remaining volume in each respective fuel tank 105',106',107'. Additionally, in an exemplary embodiment, the operational input devices 503',505', 507' may include sensors for identifying the particular fuel type within each fuel tank, for situations in which a particular fuel tank may hold multiple fuel types at different times, as discussed above. Each operational input device 503',505', 507' is in communication with the processor 102' for generating operational input signals 27',29',31', for transmission to the processor 102'.

The system 100' further illustratively includes a plurality of end use devices 105',106',107', including respective fuel tanks 105',106',107' for each respective fuel type. Each respective fuel tank 105',106',107' on the diesel-fueled power generating unit is controlled by the processor 102' to control the operating characteristics to correspond to at least one stored operating characteristic profile. The system 100' further illustratively includes a configuration input device 114', such as a location determining device, in communication with the processor 102', to generate a respective configuration signal 115' indicative of each particular location 9',11' (FIG. 12) of the diesel-fueled power generating unit along the vehicle trip 8'. The configuration signal 115' is different from the operational signals 27',29',31' transmitted from the operational input devices 503',505',507' to the processor 102'.

FIG. 10 further illustrates the system 100' including a memory 104' coupled with the processor 102' to store a respective operating characteristic profile for each configuration signal 115' indicative of each particular location 9',11' (FIG. 12) of the vehicle along the vehicle trip 8'.

The processor 102' is responsive to the operational input signals 27',29',31', configuration signals 115', and the memory 102' to generate at least one set of control signals 130',132',134' to the end use devices 105',106',107' including each respective fuel tank to limit the operating characteristics of each fuel type to the stored operating characteristics profile for each configuration signal 115' indicative of each particular location 9',11' (FIG. 12) of the diesel-fueled power generating unit along the predetermined course 8'.

In addition to the total emission output of all fuel types, as discussed in previous embodiments, the operating characteristics include the total fuel efficiency of all fuel types, total engine power output, and any other operating characteristic appreciated by one of skill in the art, where the processor generates a set of control signals to limit the total fuel efficiency and total engine power output to the respective stored fuel efficiency and engine power output profiles for each configuration signal indicative of each particular location 9',11' (FIG. 12) of the vehicle along the predetermined course 8'.

The system 100' further illustratively includes a parameter monitor 502' coupled to the processor 102' to monitor values of an operating characteristic parameter of the locomotive indicative of the operating characteristics of all fuel types. Based upon values of an operating characteristic parameter from the parameter monitor 502', the processor 102' sends secondary control signals to the end use devices 105',106', 107' to limit the operating characteristics of all fuel types to the stored operating characteristic profile within the memory 104' for the particular location 9',11' (FIG. 12) of the locomotive along the locomotive track 8'. For example, if after sending the set of initial control signals 130',132',134' to each fuel tank for each respective fuel type 105',106',107', the operating characteristics of all fuel types is not limited to the operating characteristic profile for the particular configuration signal 115' for that particular location, the secondary control signals are initiated to ensure that the operating characteristics for all fuel types is limited to the stored operating characteristic profile for each particular configuration signal and location.

For a marine vehicle involving operating characteristics of all fuel types such as sound emissions, each configuration signal is illustrated in FIG. 12. A first configuration signal 38' is initiated upon the marine vehicle 10' entering a port area 9', where the processor 22' generates a first set of control signals 40',42',44' to the end use devices 12',14',16' to limit the total sound emissions to a first stored sound emission profile within the memory for the port area. Additionally, a second configuration signal 39' is initiated when the marine vehicle 10' leaves the port area 9' and enters a non-port area 11', where the processor 22' generates a second set of control signals 46',48',49' to the end use devices 12',14'16' to limit the total sound emissions to a second stored sound emission profile within the memory for the non-port area 11'. The second stored sound emission profile may be greater than the first stored sound emission profile, as the permissible sound emission profile in a non-port area for a marine vehicle is typically larger than in a port area, for example.

Those other elements, not discussed in the configurable vehicle system 100' embodiment of the present invention, are similar to those elements discussed above, with prime notation, and require no further discussion herein.

Figure 13:
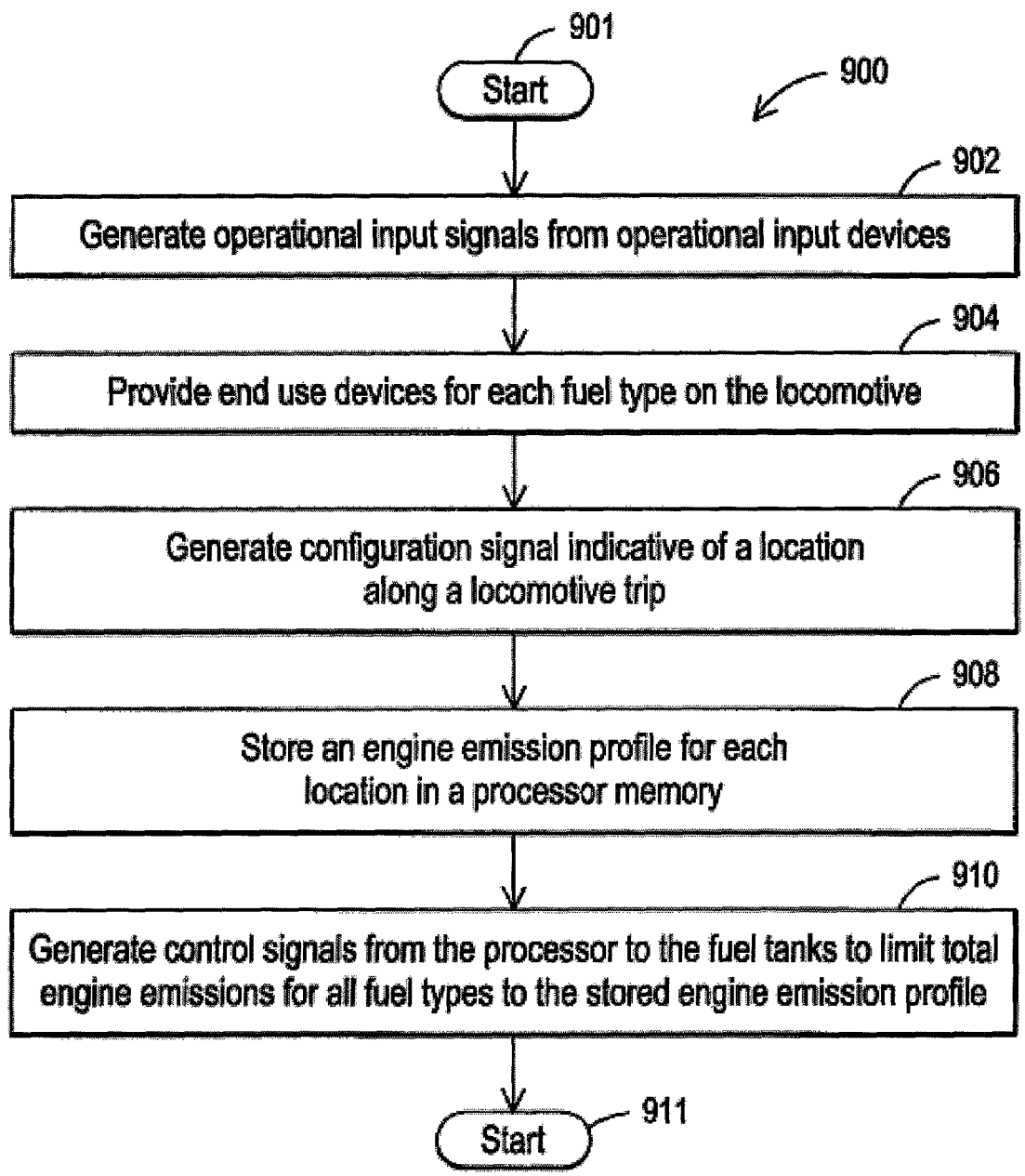
FIG. 13 is a flow chart illustrating an exemplary method embodiment of the system illustrated in FIG. 9.

A method 900 embodiment for configuring a diesel-fueled power generating unit, such as a locomotive 10' to control engine emissions of the locomotive 10' is illustrated in FIG. 13. The locomotive 10' includes a locomotive engine operating on at least one fuel type. The locomotive engine operates on each fuel type on one of an instantaneous or a duty cycle basis. For example, if the processor 22' (discussed below) decides to operate with a weighted coefficient of 80% on fuel A and 20% on fuel B, this may correspond to an instantaneous mixing of 80% of fuel A and 20% of fuel B based upon respective valve signals to respective fuel tanks holding fuel types A and B, or it may correspond to a duty cycle mixing, such as operating on fuel A for 80% of the time, while operating on fuel B for 20% of the time, for example.

FIG. 13 illustrates one embodiment of a method 900 for controlling operating characteristics of a diesel-fueled power generating unit, such as a locomotive 10'. Although FIG. 13 illustrates a method for controlling operating characteristics of a locomotive, the method may be equally applied to marine vehicles and OHV's, for example. Though exemplary embodiments of the present invention are described with respect to rail vehicles, specifically trains and locomotives having diesel engines, exemplary embodiments of the invention are also applicable for other uses, such as but not limited to off-highway vehicles, marine vessels, and stationary units, each which may use a diesel engine. Towards this end, when discussing a specified mission, this includes a task or requirement to be performed by the diesel powered system. Therefore, with respect to railway, marine or off-highway vehicle applications this may refer to the movement of the system from a present location to a destination. In the case of stationary applications, such as but not limited to a stationary power generating station or network of power generating stations, a specified mission may refer to an amount of wattage (e.g., MW/hr) or other parameter or requirement to be satisfied by the diesel powered system. Likewise, operating condition of the diesel-fueled power generating unit may include one or more of speed, load, fueling value, timing, etc.

The method begins (block 901) by generating (block 902) operational input signals 27', 29', 31', 33' from a plurality of locomotive operational input devices 26', 28', 30', 32' including sensors 26', 28', 30' for a respective fuel tank (e.g., end use devices 12', 14', 16') for each fuel type to a processor 22' on the locomotive. The method 900 subsequently involves providing (block 904) a plurality of end use devices 12', 14', 16', 18', 20' including fuel tanks (e.g., end use devices 12', 14', 16') for each respective fuel type on the locomotive controlled by the processor 22' to control the engine emissions to correspond to at least one stored engine emission profile.

The method 900 further illustratively includes generating (block 906) a respective configuration signal 35' from a configuration input device 34' in communication with the processor 22', where each configuration signal is indicative of a particular location 9',11' (FIG. 12) of the locomotive along the locomotive track 8'. The method 900 further illustratively includes storing (block 908) a respective engine emission profile for each configuration signal 35' indicative of the particular location 9',11' (FIG. 12) of the locomotive along the locomotive track 8' in a memory 24' coupled with the processor 22'.

The method 900 further illustratively includes generating (block 910) a set of control signals 13',15',17',19',21' from the processor 22' to the end use devices 12',14',16',18',20' to limit the total engine emissions of all fuel types to the stored engine emission profile for each configuration signal 35' indicative of each particular location 9',11' of the locomotive along the locomotive track 8', before the method ends at block 911. The total engine emissions of all fuel types is a weighted sum having weighted coefficients for respective engine emission of each respective fuel type.

More particularly, generating (block 910) a set of control signals 13',15',17',19',21' includes determining the weighted coefficients of each respective engine emission of each respective fuel type. The weighted coefficients for each respective fuel type are based upon each respective engine emission profile at each particular location, the individual engine emission of each respective fuel and the operational input signals indicative of the availability of each fuel type, such that the total engine emissions are limited to the stored engine emission profile for each configuration signal and particular location.

Figure 14:
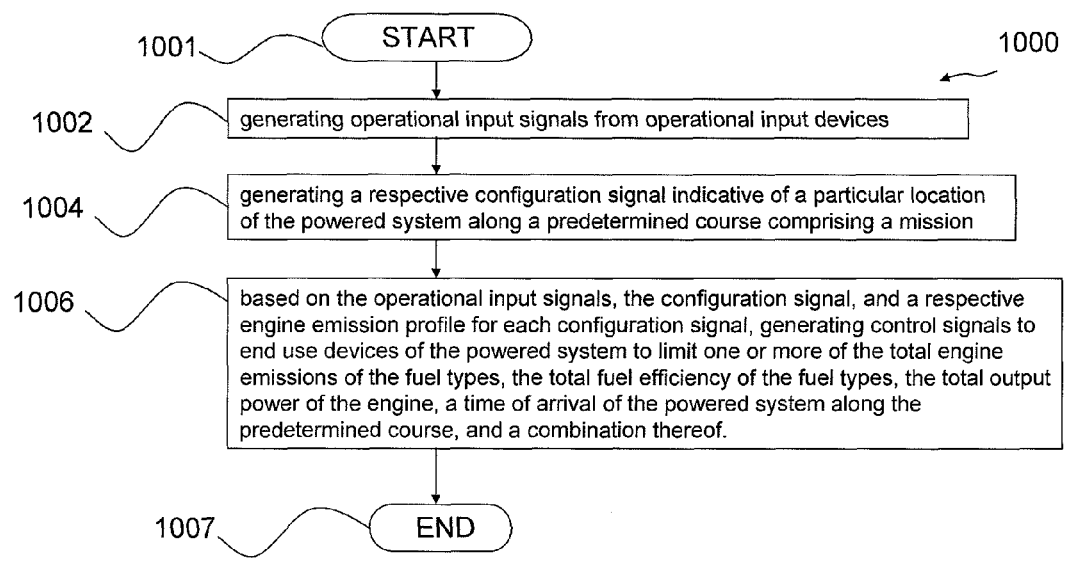
FIG. 14 is a flow chart illustrating an exemplary method embodiment of the system illustrated in FIG. 9.

FIG. 14 illustrates a flowchart depicting an exemplary embodiment of a method 1000 for controlling a powered system including an engine operating on a plurality of fuel types. The method 1000 begins at 1001 by generating 1002 operational input signals 27',29',31',33' from operational input devices 26',28',30',32'. The method 1000 further includes generating 1004 a respective configuration signal 35' indicative of a particular location 9',11' of the powered system along a predetermined course 8' comprising a mission. Based on the operational input signals 27',29',31',33', the configuration signal 35', and a respective engine emission profile for each configuration signal, the method 1000 includes generating 1006 control signals 13',15',17',19',21' to a plurality of end use devices 12',14',16',18' of the powered system to limit one or more of the total engine emissions of the plurality of fuel types, the total fuel efficiency of the plurality of fuel types, the total output power of the engine, a time of arrival of the powered system along the predetermined course, and a combination thereof, before the method 1000 ends at 1007. The end use devices include a fuel delivery system for the plurality of fuel types.

The configuration input device 34' may be a position determining device, including an automatic device such as a GPS device or a transponder, for example. Alternatively, the position determining device may be a manual device including an operator panel for manually inputting a particular configuration signal upon the locomotive entering a particular region.

For stationary applications, upon commissioning equipment including the configurable locomotive system 100', generating (block 912) a respective configuration signal 35' includes generating a configuration signal indicative of a destination location for the equipment for self-configuring the equipment for a particular engine emissions profile upon arrival at the destination location. The operational input signals 27',29',31',33' include flowrate signals indicative of the fuel volume of each respective fuel type remaining in each fuel tank.

As illustrated in FIG. 12, the locomotive travels between a first location 9' and a second location 11' along the locomotive track 8'. Upon reaching the first location 9', the processor 22' is responsive to a first configuration signal 38' to generate a first set of control signals 40',42',44' including a first set of valve signals to the fuel tanks 12',14',16' to limit the total engine emissions of all fuel types to a first stored engine emission profile. Additionally, upon reaching the second location 11', the processor 22' is responsive to a second configuration signal 39' to generate a second set of control signals 46',48',49' including a second set of valve signals to the fuel tanks 12',14',16' to limit total engine emissions of all fuel types to a second stored emission profile.

Based on the foregoing specification, an exemplary embodiment of the invention may be implemented using computer programming or engineering techniques including computer software, firmware, hardware or any combination or subset thereof, wherein the technical effect is to control engine emissions of a locomotive engine. Any such resulting program, having computer-readable code means, may be embodied or provided within one or more computer-readable media, thereby making a computer program product, i.e., an article of manufacture, according to an embodiment of the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the method of one embodiment of the invention. An apparatus for making, using or selling one embodiment of the invention may be one or more processing systems including, but not limited to, a central processing unit (CPU), memory, storage devices, communication links and devices, servers, I/O devices, or any subcomponents of one or more processing systems, including software, firmware, hardware or any combination or subset thereof, which embody an exemplary embodiment of the invention.

Various changes could be made in the above exemplary embodiments without departing from the scope of the invention. It is intended that the above description and accompanying drawings shall be interpreted as illustrative and not in a limiting sense. For example, the embodiments of the invention are described as embodied in a locomotive, while similar systems and functions may be envisioned for any off-highway vehicle (OHV), marine vehicle, or stationary power generating unit that utilizes an electro-motive drive system similar to that of a locomotive. In addition, the embodiments of the invention may be used for any mobile asset, such as cars, trucks, or buses, to manage the emissions of the mobile asset. It is further to be understood that the steps described herein are not to be construed as necessarily requiring their performance in the particular order discussed or illustrated. It is also to be understood that additional or alternative steps may be employed with the embodiments of the present invention.

What is claimed is:

1. A method comprising:
    generating operational input signals from one or more operational input devices;
    generating one or more different configuration signals indicative of respective locations of a powered system traveling along a predetermined course and having an engine configured to operate on plural different fuels, the different configuration signals associated with different respective engine emission profiles; and
    based on the one or more configuration signals, generating control signals to one or more end use devices of the powered system to direct which of plural different fuels are to be supplied to the engine in order to control at least one of engine emissions generated by the engine of the powered system when consuming one or more of the plural different fuels, a fuel efficiency of the engine of the powered system when consuming one or more of the plural different fuels, an output power of the engine, a time of arrival of the powered system at a designated location along the predetermined course, or a combination thereof;
    wherein the one or more end use devices control which of the different fuels is supplied to the engine based on the one or more configuration signals.

2. The method according to claim 1, wherein the fuel efficiency of the engine is controlled while maintaining the engine emissions at a designated level.

3. The method according to claim 1, wherein the control signals are generated by determining a weighted sum of the different fuels to be supplied to the engine, the weighted sum having weighted coefficients associated with two or more of the different fuels to reflect relative amounts of the different fuels to be supplied to the engine.

4. The method according to claim 3, wherein the control signals are generated by determining the weighted coefficients of the different fuels based on the location of the powered system.

5. The method according to claim 4, wherein the operational input signals are indicative of an available amount of one or more of the fuels.

6. The method according to claim 1, wherein generating the operational input signals includes determining the location of the powered system from at least one of a global positioning system device, at least one wayside device including a transponder, an axle counter, an axle speed sensor, a wireless system including a radio transmitter, a leaky coax, a slotted waveguide, a Doppler radar sensor, at least one imaging device for performing image recognition on at least one of a mile marker or a landmark along the predetermined course, or at least one operator for manually recognizing at least one of a mile marker or a landmark along the predetermined course.

7. The method according to claim 1, wherein generating the one or more different configuration signals includes receiving a manually input configuration signal upon the powered system entering a designated geographic region to adapt operations of the powered system during at least one of a manufacturing time, a shipping time, a configuration time, or a subsequent time upon arriving at the designated geographical region.

8. The method according to claim 1, wherein the operational input signals comprise flowrate signals indicative of volumes of the respective different fuels.

9. The method according to claim 1, wherein the powered system travels between a first location and a second location along the predetermined course;
    wherein upon reaching the first location, a first set of the control signals is generated that includes a first set of valve signals, the first set of valve signals configured to control fuel tanks storing the different fuels in order to limit the engine emissions to a first engine emission profile of the engine emission profiles that is associated with the first location; and
    wherein upon reaching the second location, a second set of the control signals is generated that includes a second set of valve signals, the second set of valve signals configured to control the fuel tanks in order to limit the engine emissions to a different, second engine emission profile of the engine emission profiles that is associated with the second location.

10. The method of claim 1, wherein the time of arrival of the powered system along at the designated location along the predetermined course is controlled while maintaining the engine emissions and the fuel efficiency at a designated level.

11. The method of claim 1, wherein the end use devices include plural fuel tanks holding the respective different fuels, and wherein the control signals that are generated direct the at least one fuel delivery system to control how much of one or more of the different fuels is supplied to the engine based on the one or more configuration signals.

12. The method of claim 11, wherein the different engine emission profiles represent limits on allowable amounts of emissions generated by the powered system when the powered system is disposed within the different locations associated with the respective configuration signals, and wherein the control signals that are generated direct the at least one fuel delivery system to change which of the different fuels are supplied to the engine when the powered system is disposed within the different locations associated with the different engine emission profiles to limit emissions generated by the powered system to within the allowable amounts of emissions that are limited by the engine emission profiles.

13. The method of claim 1, wherein the different fuels include at least a first fuel stored in a first fuel tank and a different, second fuel stored in a different, second fuel tank, and wherein the control signals that are generated direct the one or more end use devices to separately control how much of the first fuel is supplied from the first fuel tank to the engine of the powered system and how much of the second fuel is separately supplied from the second fuel tank to the engine.

14. The method of claim 13, wherein the control signals that are generated separately control a first flow of the first fuel supplied from the first fuel tank and a second flow of the second fuel that is concurrently supplied from the second fuel tank.

15. The method of claim 13, wherein, when the powered system is disposed within a first location associated with a first emissions profile, the control signals are generated to cause the one or more end use devices to supply a first amount of the first fuel from the first fuel tank and to supply a second amount of the second fuel from the second fuel tank and,
when the powered system moves to another, different second location associated with a different, second emissions profile, the control signals are generated to cause the one or more end use devices to increase supply of the first fuel from the first fuel tank to a third amount that is greater than the first amount of the first fuel and to decrease supply of the second fuel from the second fuel tank to a fourth amount that is smaller than the second amount of the second fuel.

16. A system comprising:
an operational input device configured to generate input signals indicative of locations of a vehicle as the vehicle travels along a route;
one or more processors configured to receive the input signal and to generate configuration signals based on the locations of the vehicle, the configuration signals representative of one or more different emissions profiles associated with different geographic areas, the different emissions profiles designating different limitations on allowable amounts of emissions that are generated for the respective different geographic areas; and
plural end use devices configured to control supply of plural respective different fuels to an engine of the vehicle in order to power the vehicle, wherein amounts of the respective different fuels that are supplied by the respective end use devices to the engine are controlled based on the configuration signals in order to limit actual emissions generated by the vehicle to within the limitations on the allowable amounts of emissions designated by the emissions profile associated with the geographic location in which the vehicle is located.

17. The system of claim 16, wherein the one or more processors are configured to receive the input signal and automatically generate the configuration signals as the vehicle travels along the route to automatically update the emissions profile that limits the allowable amounts of emissions generated by the vehicle as the vehicle moves along the route and between the different geographic areas.

18. The system of claim 16, wherein the one or more processors are configured to generate one or more of the configuration signals that direct the end use devices to change which of the fuels is supplied to the engine to power the vehicle based on which of the different geographic areas that the vehicle is within.

19. The system of claim 16, wherein the one or more processors are configured to generate one or more of the configuration signals that direct the end use devices to change a mixture of two or more of the different fuels that is supplied to the engine to power the vehicle based on which of the different geographic areas that the vehicle is within.

20. The system of claim 16, wherein the different fuels include at least a first fuel stored in a first fuel tank and a different, second fuel stored in a different, second fuel tank, and wherein the one or more processors are configured to generate the configuration signals such that the one or more end use devices are directed to separately control how much of the first fuel is supplied from the first fuel tank to the engine of the powered system and how much of the second fuel is separately supplied from the second fuel tank to the engine.

21. The system of claim 20, wherein the one or more processors are configured to generate the configuration signals to direct the one or more end use devices to separately control a first flow of the first fuel supplied from the first fuel tank and a second flow of the second fuel that is concurrently supplied from the second fuel tank.

22. The system of claim 20, wherein, when the powered system is disposed within a first location associated with a first emissions profile, the one or more processors generate the configuration signals to direct the one or more end use devices to supply a first amount of the first fuel from the first fuel tank and to supply a second amount of the second fuel from the second fuel tank and,
when the powered system moves to another, different second location associated with a different, second emissions profile, the one or more processors generate the configuration signals to direct the one or more end use devices to increase supply of the first fuel from the first fuel tank to a third amount that is greater than the first amount of the first fuel and to decrease supply of the second fuel from the second fuel tank to a fourth amount that is smaller than the second amount of the second fuel.

23. A method comprising:
receiving input signals indicative of locations of a vehicle as the vehicle travels along a route;
generating configuration signals based on the locations of the vehicle, the configuration signals representative of one or more different emissions profiles associated with different geographic areas, the different emissions profiles designating different limitations on allowable amounts of emissions that are generated for the respective different geographic areas; and
controlling supply of plural respective different fuels to an engine of the vehicle in order to power the vehicle, wherein amounts of the respective different fuels that are supplied to the engine are controlled based on the configuration signals in order to limit actual emissions generated by the vehicle to within the limitations on the allowable amounts of emissions designated by the emissions profile associated with the geographic location in which the vehicle is located.

24. The method of claim 23, wherein the configuration signals are automatically generated as the vehicle travels along the route to automatically update the emissions profile that limits the allowable amounts of emissions generated by the vehicle as the vehicle moves along the route and between the different geographic areas.

25. The method of claim 23, wherein one or more of the configuration signals are generated to direct the end use devices to change which of the fuels is supplied to the engine to power the vehicle based on which of the different geographic areas that the vehicle is within.

26. The method of claim 23, wherein one or more of the configuration signals are generated to direct the end use devices to change a mixture of two or more of the different fuels that is supplied to the engine to power the vehicle based on which of the different geographic areas that the vehicle is within.

27. The method of claim 23, wherein the different fuels include at least a first fuel stored in a first fuel tank and a different, second fuel stored in a different, second fuel tank, and wherein controlling the supply of the different fuels comprises separately controlling how much of the first fuel is supplied from the first fuel tank to the engine of the powered system and how much of the second fuel is separately supplied from the second fuel tank to the engine.

28. The method of claim 27, wherein controlling the supply of the different fuels includes separately controlling a first flow of the first fuel supplied from the first fuel tank and a second flow of the second fuel that is concurrently supplied from the second fuel tank.

29. The method of claim 27, wherein, when the powered system is disposed within a first location associated with a first emissions profile, controlling the supply of the different fuels includes supplying a first amount of the first fuel from the first fuel tank and supplying a second amount of the second fuel from the second fuel tank and, when the powered system moves to another, different second location associated with a different, second emissions profile, supply of the first fuel from the first fuel tank is increased to a third amount that is greater than the first amount of the first fuel and supply of the second fuel from the second fuel tank is decreased to a fourth amount that is smaller than the second amount of the second fuel.

30. A method comprising:

generating operational input signals from one or more operational input devices;

generating one or more different configuration signals indicative of respective locations of a powered system traveling along a predetermined course and having an engine configured to operate on plural different fuels, the different configuration signals associated with different respective engine emission profiles; and based on the one or more configuration signals, generating control signals to one or more end use devices of the powered system to direct which of plural different fuels are to be supplied to the engine in order to control engine emissions generated by the engine of the powered system when consuming one or more of the plural different fuels, the control signals including a first set of valve signals configured to control fuel tanks storing the different fuels in order to limit the engine emissions to a first engine emission profile associated with a first location of the powered system and a second set of valve signals configured to control the fuel tanks in order to limit the engine emissions to a different, second engine emission profile that is associated with a different, second location of the powered system, wherein the one or more end use devices control which of the different fuels is supplied to the engine based on the one or more configuration signals.

* * * * *